US009483352B2

(12) United States Patent
Thiele et al.

(10) Patent No.: US 9,483,352 B2
(45) Date of Patent: Nov. 1, 2016

(54) PROCESS CONTROL SYSTEMS AND METHODS

(71) Applicant: Fisher-Rosemount Systems, Inc., Round Rock, TX (US)

(72) Inventors: Dirk Thiele, Austin, TX (US); Shaobo Qiu, Austin, TX (US); Mark Nixon, Round Rock, TX (US)

(73) Assignee: FISHER-ROSEMONT SYSTEMS, INC., Round Rock, TX (US)

( * ) Notice: Subject to any disclaimer, the term of this patent is extended or adjusted under 35 U.S.C. 154(b) by 109 days.

(21) Appl. No.: 14/494,214

(22) Filed: Sep. 23, 2014

(65) Prior Publication Data

US 2015/0095692 A1    Apr. 2, 2015

Related U.S. Application Data

(60) Provisional application No. 61/883,748, filed on Sep. 27, 2013.

(51) Int. Cl.
*G06F 11/00* (2006.01)
*G06F 11/14* (2006.01)
*G06F 9/455* (2006.01)
(Continued)

(52) U.S. Cl.
CPC ....... *G06F 11/1438* (2013.01); *G06F 9/45533* (2013.01); *G06F 11/1484* (2013.01); *G06F 17/30174* (2013.01); *G06F 11/2035* (2013.01); *G06F 2009/45591* (2013.01)

(58) Field of Classification Search
CPC ........................ G06F 11/1438; G06F 11/1484
See application file for complete search history.

(56) References Cited

U.S. PATENT DOCUMENTS 6,665,775 B1 * 12/2003 Maiyuran ............. G06F 12/084
711/128

2004/0059805 A1 * 3/2004 Dinker ................ G06F 11/2069
709/223
2005/0144610 A1 * 6/2005 Zenz .................... G06F 9/5011
717/168

(Continued)

FOREIGN PATENT DOCUMENTS

GB      WO 2012084839 A1 *  6/2012 ........... G06F 11/1482
WO      2012084839          6/2012

OTHER PUBLICATIONS

United Kingdom Intellectual Property Office, "Search Report," issued in connection with GB Application No. GB1417033.6, issued on Mar. 27, 2015, 6 pages.

(Continued)

*Primary Examiner* — Yolanda L Wilson
(74) *Attorney, Agent, or Firm* — Hanley, Flight & Zimmerman, LLC

(57) ABSTRACT

Process control system and methods are disclosed. An example method includes operating a first cluster including first virtual machines and first servers and operating a second cluster including second virtual machines and second servers. The example method also includes storing first data from the first virtual machines at a first data store of the first cluster and storing a replica of the first data at a second data store of the second cluster. The example method also includes storing second data from the second virtual machines at the second data store and storing a replica of the second data at the first data store and identifying a failure of the first cluster. The method also includes, in response to the failure, restarting the first virtual machines using the second servers and the replica of the first data at the second data store.

27 Claims, 20 Drawing Sheets

(51) Int. Cl.
*G06F 17/30* (2006.01)
*G06F 11/20* (2006.01)

(56) References Cited

U.S. PATENT DOCUMENTS

| | | | | |
|---|---|---|---|---|
| 2007/0174361 A1* | 7/2007 | Branda | G06F 9/4856 | |
| 2007/0214380 A1* | 9/2007 | Rothman | G06F 11/1484 | 714/5.11 |
| 2008/0126445 A1 | 5/2008 | Michelman | | |
| 2009/0119541 A1* | 5/2009 | Inoue | G06F 9/4411 | 714/10 |
| 2010/0054120 A1* | 3/2010 | Beeken | G06F 11/1484 | 370/221 |
| 2011/0321041 A1* | 12/2011 | Bhat | G06F 9/4856 | 718/1 |
| 2012/0233282 A1* | 9/2012 | Voccio | G06F 9/45558 | 709/212 |
| 2012/0278801 A1* | 11/2012 | Nelson | G06F 9/45533 | 718/1 |
| 2013/0036323 A1* | 2/2013 | Goose | G06F 11/1484 | 714/4.11 |
| 2014/0033201 A1* | 1/2014 | Dawkins | G06F 11/1484 | 718/1 |
| 2014/0165056 A1* | 6/2014 | Ghai | G06F 12/0891 | 718/1 |
| 2014/0222953 A1* | 8/2014 | Karve | G06F 9/455 | 709/217 |

OTHER PUBLICATIONS

Microsoft, "Microsoft Big Data", Solution Sheet, 2011, retrieved on Mar. 8, 2016, [http://download.microsoft.com/download/1/8/B/18BE3550-D04C-4B3F-9310-F8BC1B62D397/MicrosoftBigDataSolutionSheet.pdf], 5 pages.
Microsoft, "SQL Server Analysis Services to Hive", retrieved on Mar. 8, 2016, [http://msdn.microsoft.com/en-us/library/jj710329.aspx], 1 page.
Control Loop Foundation, "Batch and Continuous Processes—Interactive Source for Process Control", retrieved on Mar. 8, 2016, [www.controlloopfoundation.com], 1 page.
Dimiduk et al., "HBase in Action", Manning Publications, 2012, 362 pages.
Emerson Process Management, "DeltaV Virtualization Product Update", 2012 Emerson Global Users Exchange, 39 pages.

* cited by examiner

PROCESS CONTROL SYSTEMS AND METHODS

RELATED APPLICATION

This patent claims priority to U.S. Provisional Patent Application No. 61/883,748, filed Sep. 27, 2013, which is hereby incorporated herein by reference in its entirety.

BACKGROUND

A typical control system includes a network of many workstations, servers, controllers and I/O subsystems. The setup and maintenance of multiple systems needed for development, testing, training and on-line production can be expensive and time consuming.

SUMMARY

An example method includes operating a first cluster including first virtual machines and first servers and operating a second cluster including second virtual machines and second servers. The method also includes storing first data from the first virtual machines at a first data store of the first cluster and storing a replica of the first data at a second data store of the second cluster. The method also includes storing second data from the second virtual machines at the second data store and storing a replica of the second data at the first data store. The method includes identifying a failure of the first cluster and, in response to the failure, restarting the first virtual machines using the second servers and the replica of the first data at the second data store.

Another example method includes selecting a first mode to operate a first cluster including first virtual machines and first servers and operating the first cluster in the first mode including writing to a cache of a first data store to store the first data from the first virtual machines. The method includes selecting a second mode to operate the first cluster and operating the first cluster in the second mode including circumventing the cache and writing directly to a disk of the first data store to store first data from the first virtual machines.

BRIEF DESCRIPTION OF THE DRAWINGS

FIGS. 8-11 depict example user interfaces that can be used to the implement the process control system of FIG. 3 or the process control systems of FIGS. 1 and 2.

The figures are not to scale. Wherever possible, the same reference numbers will be used throughout the drawing(s) and accompanying written description to refer to the same or like parts.

DETAILED DESCRIPTION

Virtual environments may be implemented in companies to reduce datacenter space, improve security, reduce cost and/or reduce energy consumption. In some example virtual environments, virtual machines (VMs) operate on a single server where the loss of the single servers causes the loss and/or inoperativeness of the associated VMs.

In some example process control systems, to substantially prevent against the loss of the VMs when a corresponding server becomes inoperative, the example virtualization architecture disclosed herein enables the replication of VMs to other hosts to enable the VMs to be relatively quickly restarted after a sudden loss of the corresponding server or other components.

In other example process control systems, example support hosts are clustered in an example cluster environment where the VMs are run and/or the data from each of the VMs is centrally stored and/or generally accessible. In some such examples, the cluster environment is configured and/or setup to automatically restart VMs in the cluster using saved data from the data store if one of the hosts is lost on which the VMs was running In other example process control systems, example support hosts are clustered in an example cluster environment and an additional server is used for replication (e.g., used to store data associated with the VMs and/or the hosts). In such examples, if the cluster is lost, the VMs may be relatively quickly restarted on the additional and/or replication server using the data saved thereon.

In other example process control systems, two separate clusters of support hosts may be used to enable replication between the clusters. In some such examples, data from both the first cluster (e.g., the VMs of the first cluster) and the second cluster (e.g., the VMs of the second cluster) are replicated and stored in separate data bases associated with the respective clusters. In some examples, by running some of the first VMs on the first cluster and the second VMs on the second cluster, if the first cluster or second cluster fails, the VMs associated with the failed cluster can be relatively easily restarted and/or run on the operable cluster. Thus, control of the plant is maintained using the remaining operable cluster. Additionally or alternatively, in examples in which the first VMs are redundant of the second VMs, by running the first VMs on the first cluster and the second VMs on the second cluster, if the first cluster or the second cluster fails, the VMs associated with the operable cluster can still be used to control the process (e.g., the secondary VMs can be used to run the plant). Having multiple clusters with replication enables high availability.

Figure 1:
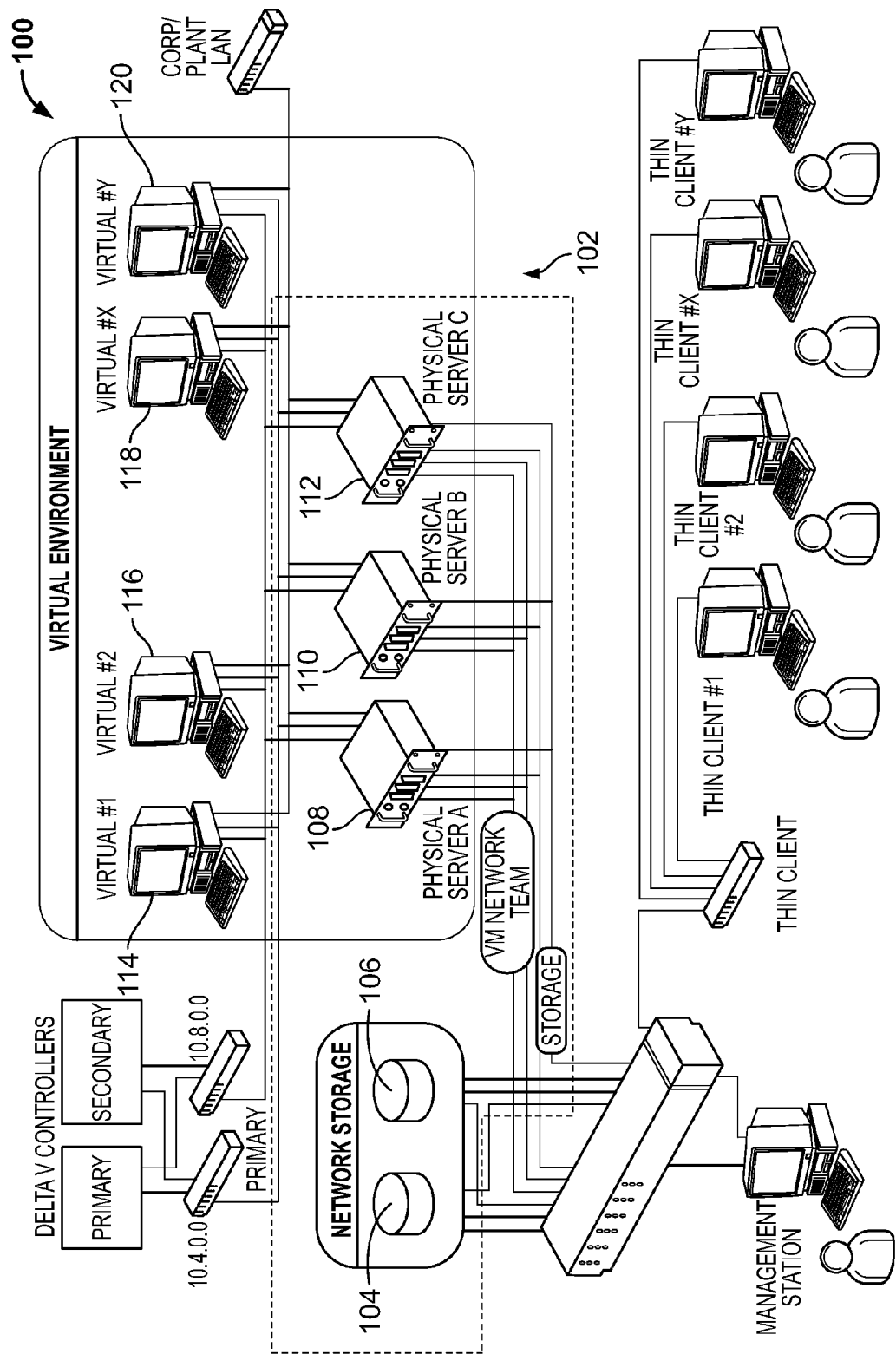
FIG. 1 illustrates an example process control system that can be used to implement the examples disclosed herein.

FIG. 1 shows an example process control system 100 including a cluster 102 that associates and/or brings together storage, network roles and/or nodes in a single console. In some examples, the cluster 102 includes network devices (e.g., switches, firewalls and/or storage devices), storages and/or data stores 104, 106, a failover cluster and/or processor and one or more groups of servers 108, 110, 112 that are associated in virtual space. In some examples, one group of servers 108, 110, 112 may be referred to as a node and the cluster 102 may include any number of nodes (e.g., 22, 50, 64, etc.). In some examples, the failover cluster acts as a manager that associates the components of the cluster with a single console. In some examples, users and services that use a cluster can connect to a virtual name and/or space created by the failover cluster.

In operation, virtual machines (VMs) 114, 116, 118 and 120 operate on the servers 108, 110, 112 and data associated with actions performed by the VMs 114, 116, 118 and/or 120 is stored at the data store 104, 106. Thus, if one of the servers 108, 110, 112 fails, the VMs 114, 116, 118 and/or 120 that were running on the failed server 108, 110 and/or 112 will be restarted on the still operating servers 108, 110 and/or 112 using data associated with that VM 114, 116, 118 and/or 120 stored at the data store 104, 106. In examples in which the cluster 102 includes a first node of servers operating VMs and a second node of servers operating VMs, if the first node fails, the VMs associated with the first node will be restarted using the second node.

The examples disclosed herein can support up to approximately 64 nodes per cluster and up to approximately 4,000 VMs. The disclosed examples enable the clusters to be automatically updated (e.g., Cluster-Aware Updating) and for substantially simultaneous live migration of one or more of the clusters and/or the associated nodes. The examples disclosed herein can support Hyper-V Replica Broker to enable and/or support Hyper-V Replica in a clustered environment, virtual machine application monitoring and/or cluster validation tests. The examples disclosed herein enable cluster upgrade and/or migration, cluster shared volumes 2.0 and/or VM failover prioritization. In some such examples, VM health and location can are integrated into DeltaV diagnostics to enable users not to have to move to other environments to diagnose their system. In some examples, failover prioritization enables critical VMs first (e.g., Batch Executive).

Figure 2:
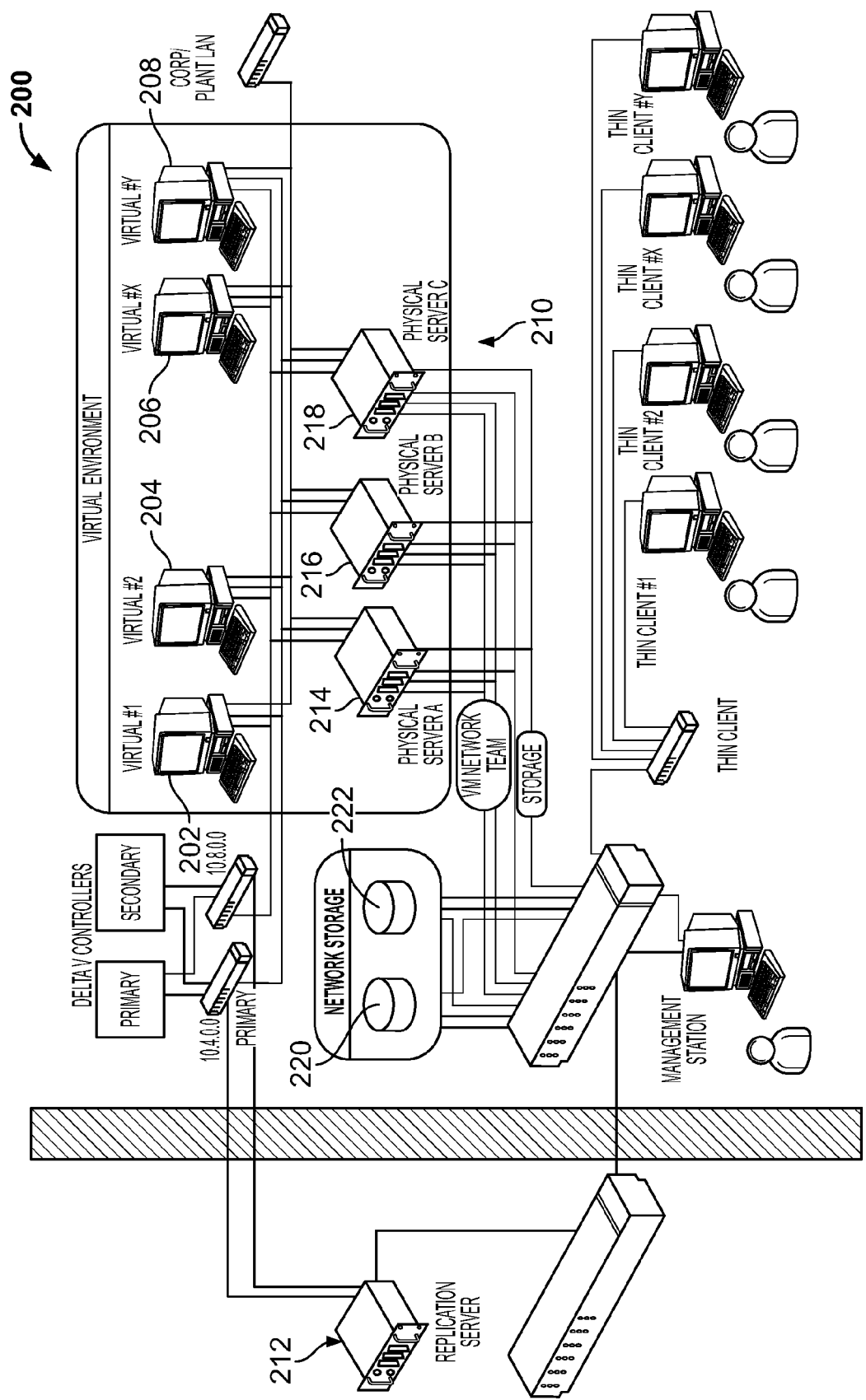
FIG. 2 illustrates another example process control system that can be used to implement the examples disclosed herein.

FIG. 2 shows an example process control system 200 including high availability and an example integrated replication engine (e.g., Hyper-V Replica, brokering role). In some examples, this replication engine enables virtual machines (VMs) 202, 204, 206, 208 of a cluster 210 to be replicated at a replication server (e.g., a distant server) 212 using a single network connection. For example, regarding replication, Hyper-V Replica Broker is a role and/or application running on one or more of the VMs 202, 204, 206, 208 where the cluster 210 will determine and/or vote which node has the brokering role. The brokering role is highly available such that if one node is lost and/or goes down, the brokering role will be failed over to another node. In some examples, the server 212 additionally or alternatively includes Hyper-V Replica Service running thereon to receive and/or sync replication data.

In some examples, the replication engine includes a module that tracks and/or writes within a virtual hard disk file used by all of the VMs 202, 204, 206, 208 and/or generates a log file. By enabling the replication to occur at a virtual hard disk (VHD) level, the ease of replication of any one of the VMs 202, 204, 206, 208 is increased. In some examples, the replication of the VMs 202, 204, 206, 208 occurs periodically and/or asynchronously through a connection (e.g., a HTTP connection, an HTTPS connection, etc.).

In operation, the VMs 202, 204, 206, 206 operate on servers 214, 216, 218 and data associated with and/or actions performed by the VMs 202, 204, 206, 208 is stored at data stores 220, 222 and a replica of the same is stored at the replication server 212 and/or another location. Thus, if the cluster 210 and/or all the servers 214, 216, 218 fail, the VMs 202, 204, 206, 208 that were running on the failed cluster 210 and/or the failed servers 214, 216, 216 will be restarted on and/or using the replication server 212 from data associated with the VMs 202, 204, 206, 208 stored at the replication server 212 and/or another location. Thus, the example process control system 200 enables the VMs 202, 204, 206, 208 to continue to run and/or operate after a failure, thereby being compliant with substantially all disaster recovery programs.

In some examples, the data from the VMs 202, 204, 206, 208, is replicated, conveyed and/or transmitted to the replication server 212 using a network module (e.g., data compression and/or optimization), which optimizes the workload by working in slow network connections (e.g., WANs). In some examples, to implement the example process control system 200 of FIG. 2, two or more servers 212, 214, 216, 218 are used that are connected by a network connection where at least one of the servers is the replication server 212. In some such examples, the two or more servers 212, 214, 216, 218 run an application such as Hyper-V and no other third-party hardware, software applications and/or shared storage are needed. In some examples, the example process control system 200 includes recovery points to enable any one or more of the VMs 202, 204, 206 and 208 to be restarted at substantially any point in time. In some examples, by using such recovery points, database corruption and/or virus replication is reduced, substantially eliminated and/or eliminated.

In some examples, the example process control system 200 and/or Hyper-V Replica enables and/or provides small and/or medium-sized companies with a full disaster recovery infrastructure solution for their virtualized environments using few components at a reasonable cost. In some examples, DeltaV Primary and/or Secondary networks may be added to the replication server 212 to enable the VMs 202, 204, 206, 208 to be more quickly started at and/or using the replication server 212.

Figure 3:
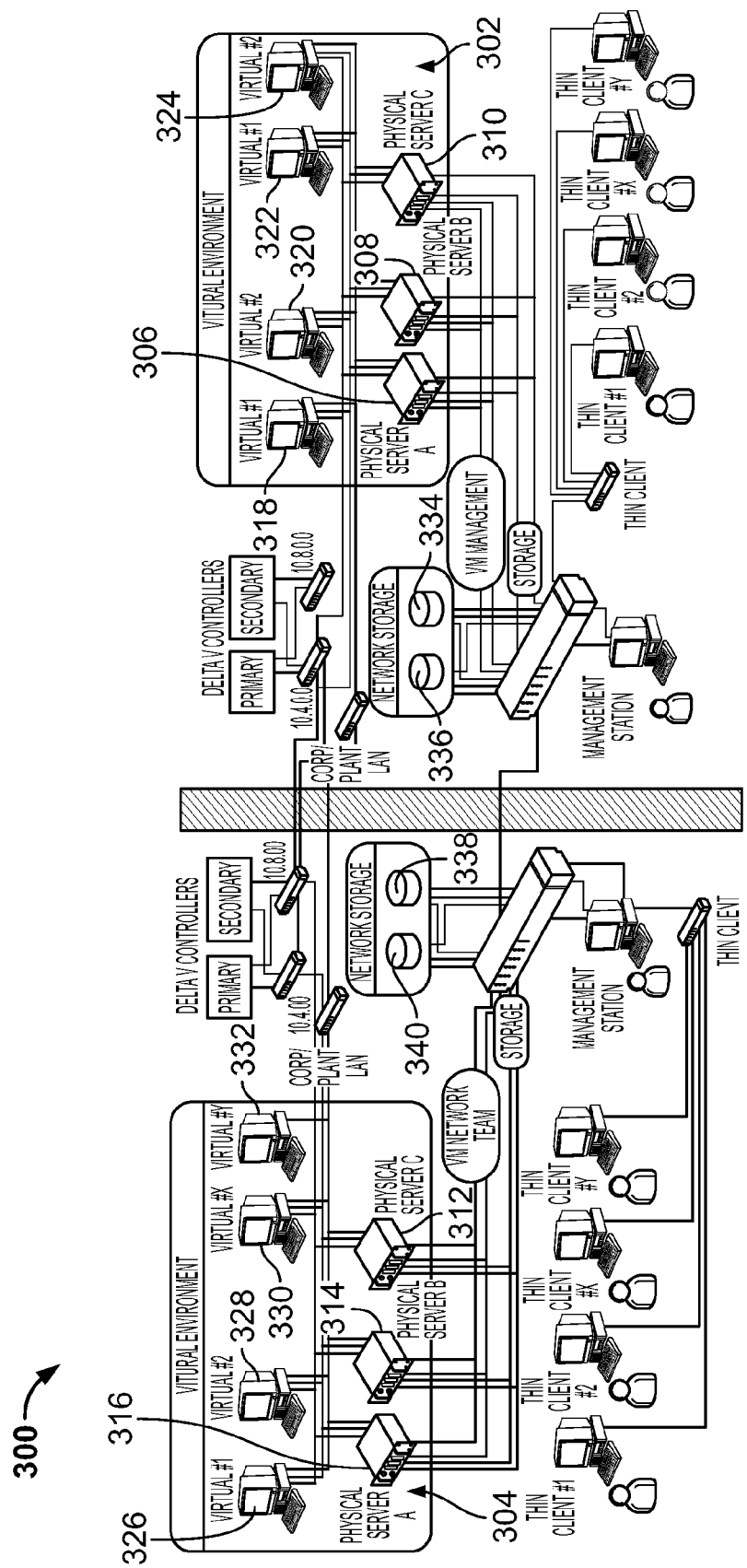
FIG. 3 illustrates another example process control system that can be used to implement the examples disclosed herein.

FIG. 3 shows an example process control system 300 including a first cluster and/or virtualization cluster 302 and a second cluster and/or virtualization cluster 304 where either of primary servers 306, 308, 310 of the first cluster 302 or replication servers 312, 314, 316 of the second cluster 304 are configured to have a brokering role (e.g. Hyper-V Replica Broker role). The brokering role enables the clusters 302 and/or 304 to be associated with and/or part of Hyper-V Replica to support and/or enable seamless replication between the clusters 302, 304, for example.

In operation, virtual machines (VMs) 318, 320, 322, 324 operate on the servers 306, 308, 310 and VMs 326, 328, 330, 332 operate on the servers 312, 314, 316. In some examples, VMs 318, 320, 322, 324 are replicas of the VMs 326, 328, 330, 332. In some examples, the VMs 318, 320, 322, 324 are partially or wholly different from the VMs 326 328, 330, 332.

In examples in which the VMs 318, 320, 322, 324 are replicas of the VMs 326, 328, 330, 332, data associated with and/or the actions performed by the VMs 318, 320, 322, 324 is stored at data stores 334, 336 of the first cluster 302 and a replica of the data is stored at data stores 338, 340 of the second cluster 304. Thus, if the first cluster 302 and/or all the servers 306, 308, 310 fail, the VMs 318, 320, 322, 324 that were running on the failed cluster 302 and/or the failed servers 306, 308, 310 will be restarted on and/or using the replication servers 312, 314, 316 from data associated with the VMs 318, 320, 322, 324 stored at the data stores 338, 340. Thus, the example process control system 300 enables the VMs 318, 320, 322, 324 to continue to run and/or operate after a failure.

In examples in which the VMs 318, 320, 322, 324 are different from the VMs 326 328, 330, 332, data associated with and/or the actions performed by the VMs 318, 320, 322, 324 is stored at the data stores 334, 336 of the first cluster 302 and a replica of the data is stored at the data stores 338, 340 of the second cluster 304 and data associated with and/or the actions performed by the VMs 326, 328, 330, 332 is stored at the data stores 338, 340 of the second cluster 304 and a replica of the data is stored at the data stores 334, 336 of the first cluster 302. Thus, if the first cluster 302 or the second cluster 304 fails, the VMs 318, 320, 322, 324, 326, 328, 330, 332 that were running on the failed first cluster 302 or the failed second cluster 304 will be restarted on and/or using the servers 306, 308, 310 or the replication servers 312, 314, 316 from data associated with the respective VMs 318, 320, 322, 324, 326, 328, 330, 332 stored at the data stores 334, 336, 338 and/or 340. Once the failed first cluster 302 or the failed cluster 304 has been recovered, the VMs 318, 320, 322, 324, 326, 328, 330, 332 can be replicated and/or migrated to their original cluster 302 or 304 to resume normal operation.

Figure 4:
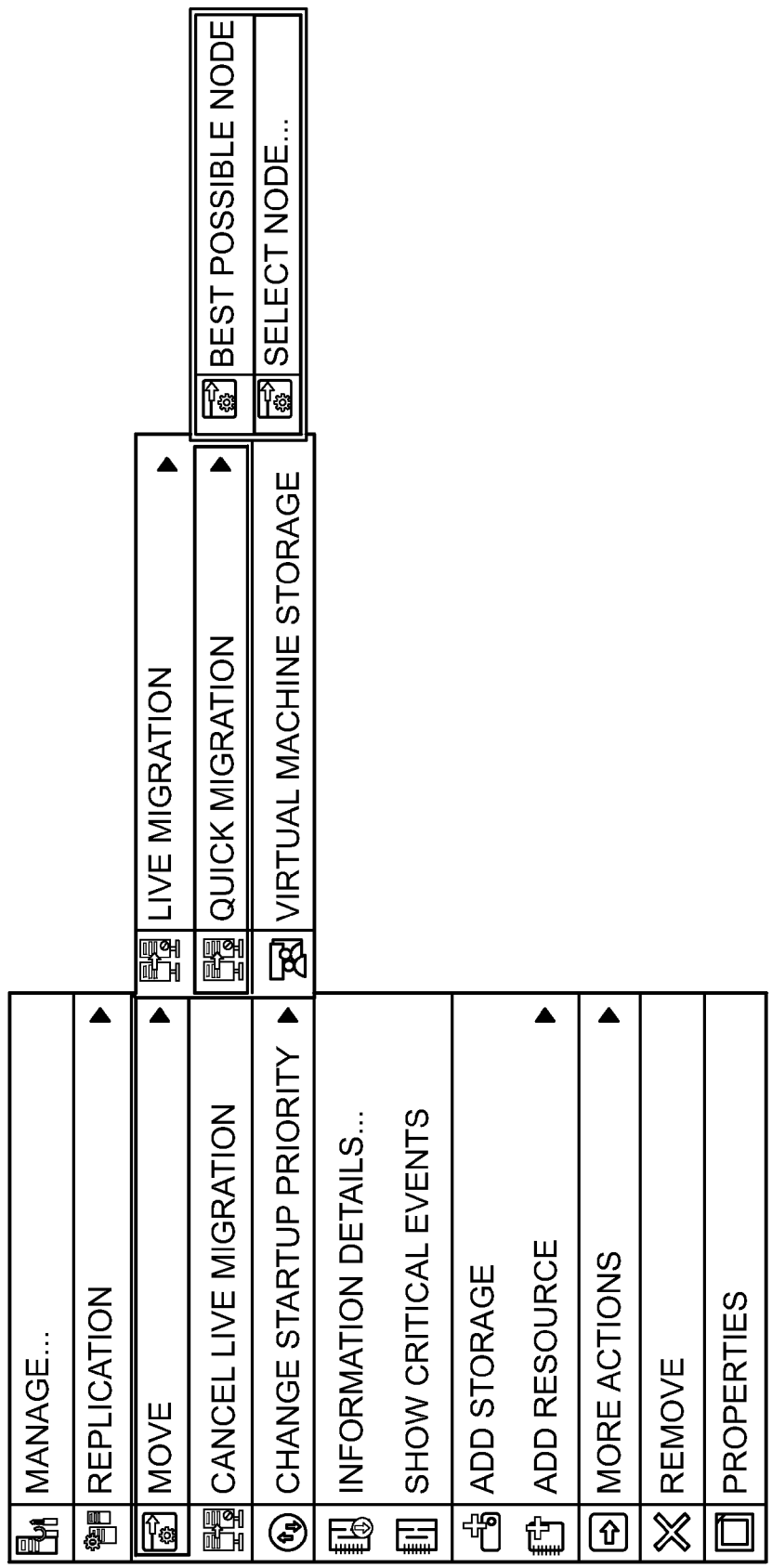
FIG. 4 illustrates an example user interface that can be used during a live migration in accordance with the teachings of this disclosure.

FIG. 4 illustrates an example user interface 400 that can be used during a live migration. In some examples, a shared nothing live migration may take approximately 8 to 10 minutes, a storage live migration may take approximately 5 to 7 minutes, a live migration over comma separated value (CSV) may take approximately 10 to 30 seconds and a quick migration over CSV may take approximately 5 seconds.

Figure 5:
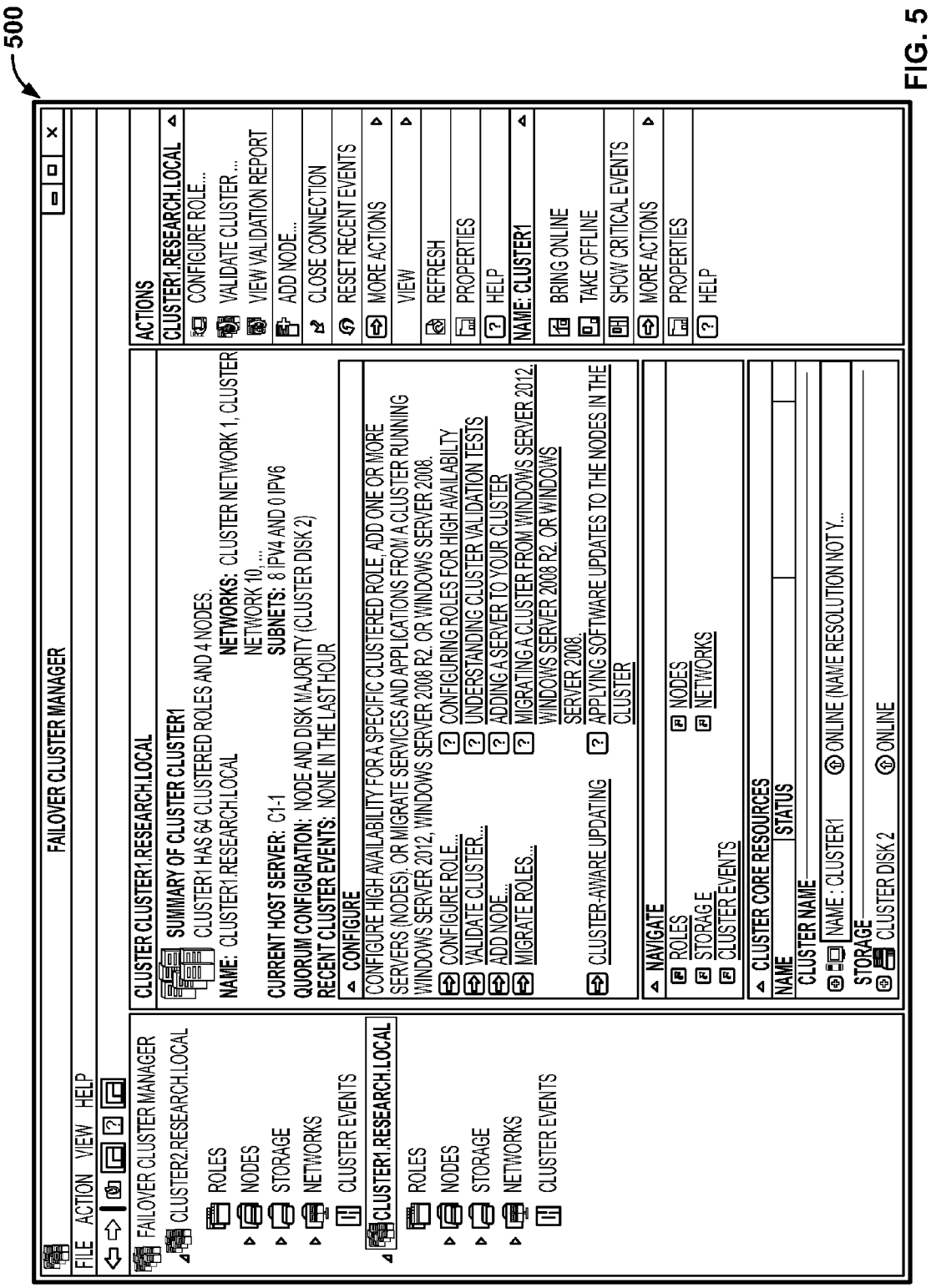
FIGS. 5-7 depict example user interfaces that can be used to implement the process control system of FIG. 1 or the process control systems of FIGS. 2 and 3.
Figure 6:
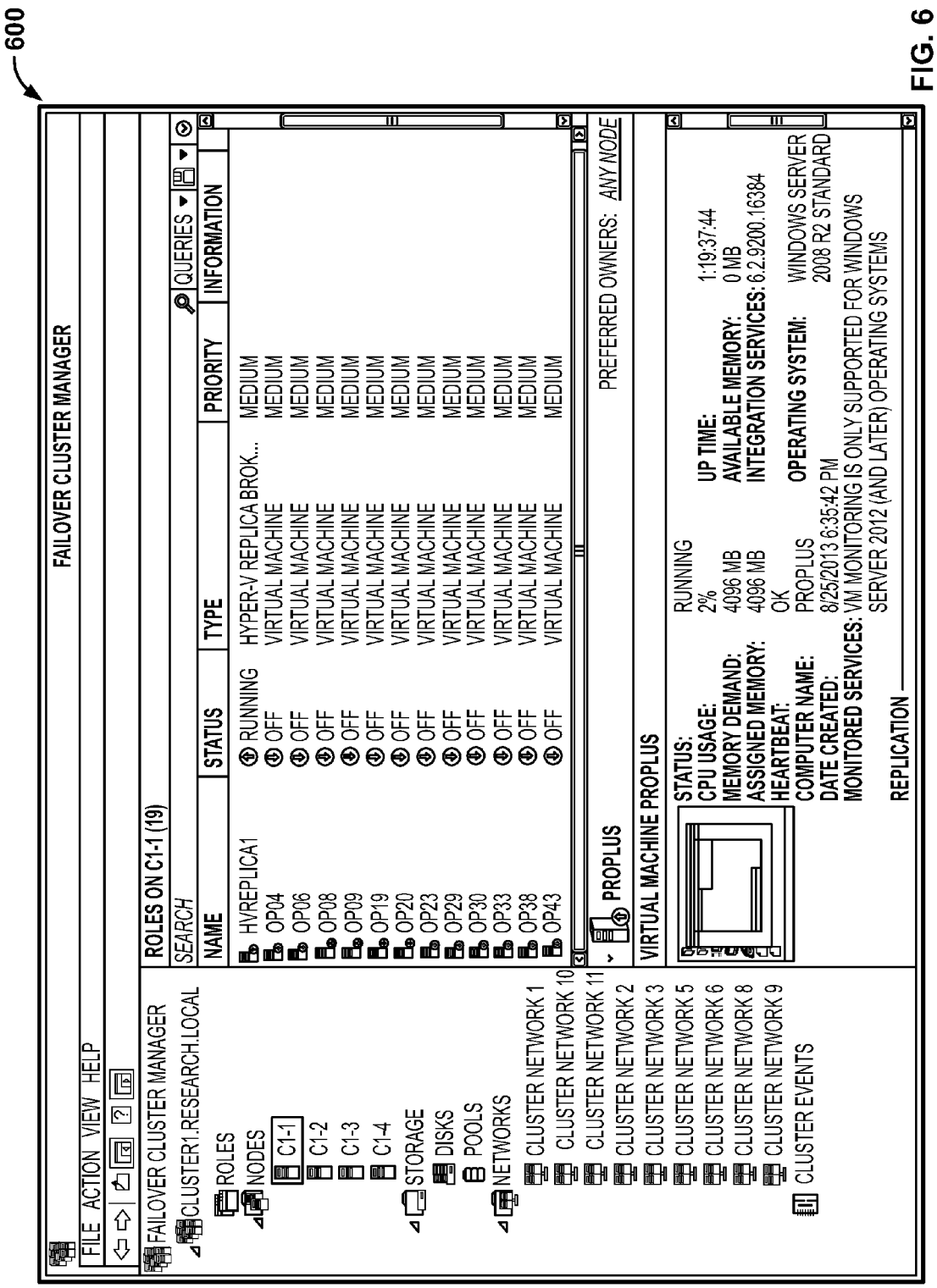
Figure 7:
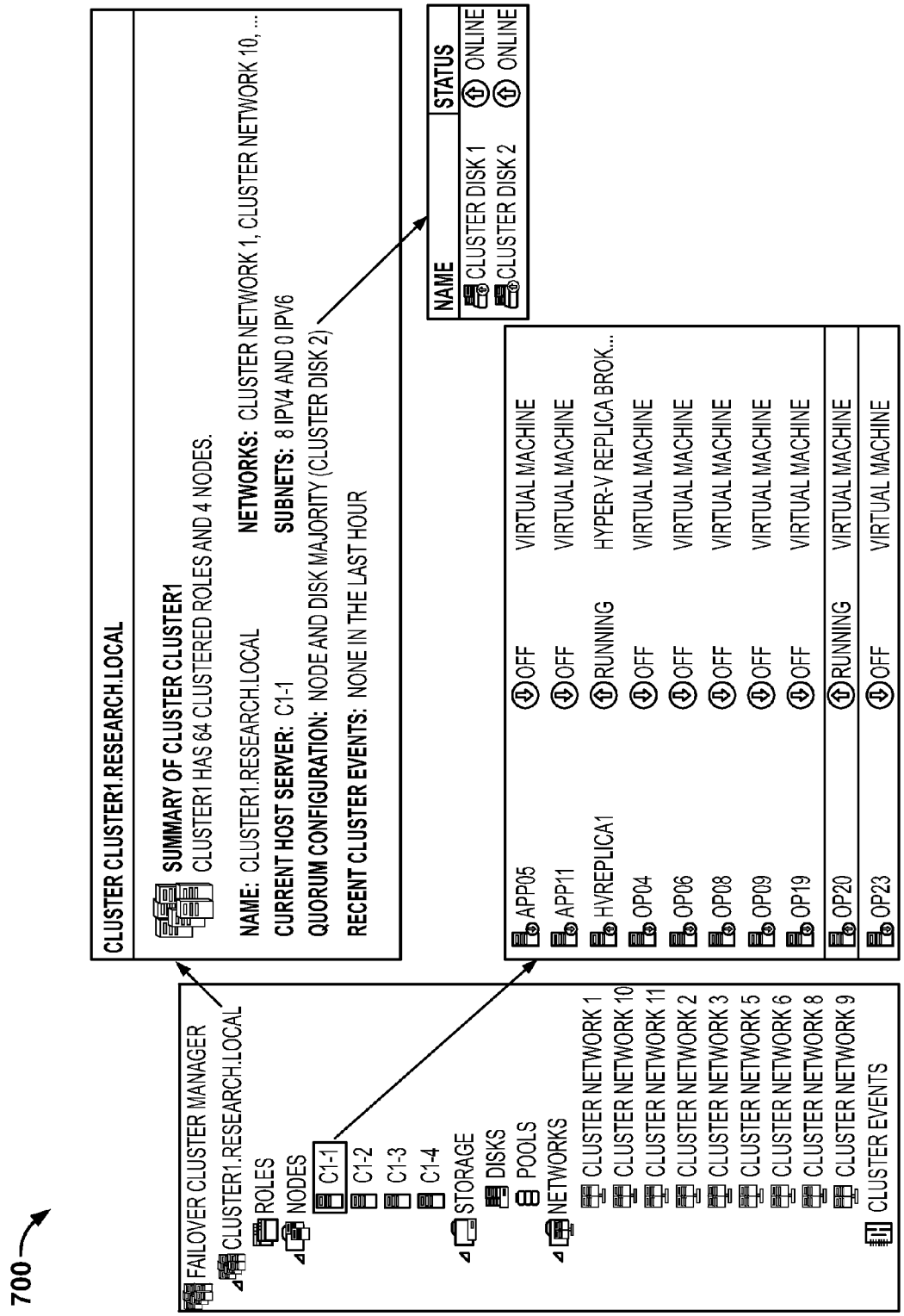
Figure 8:
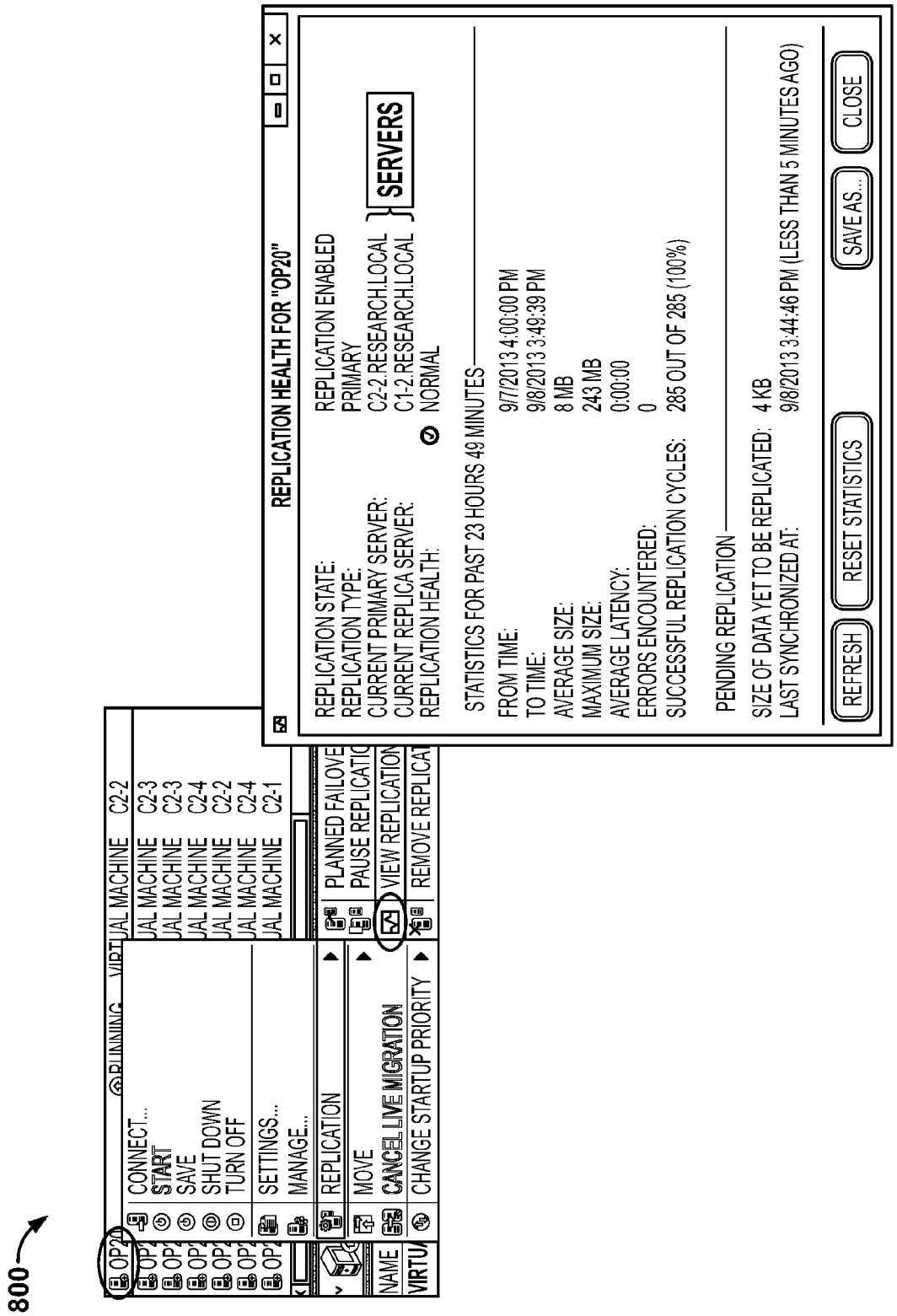

FIGS. 5-7 depict example user interfaces 500, 600, 700 that can be used to implement the examples disclosed herein (e.g., configure and manipulate virtual machines). In some examples, the user interfaces 500, 600, 700 can be used to implement the process control system 100 of FIG. 1. The user interface 600 of FIG. 6 shows the status of the different operations of the selected C1-1 node and/or enables the selection of the different nodes (e.g., C1-1; C1-2; C1-3, etc.) and different clusters (e.g., 1, 10, 11, 2, 3, etc.) to their respective statuses. The user interface 700 of FIG. 7 shows the status of the different operations of the selected C1-1 node and provides a summary of Cluster 1.

Figure 9:
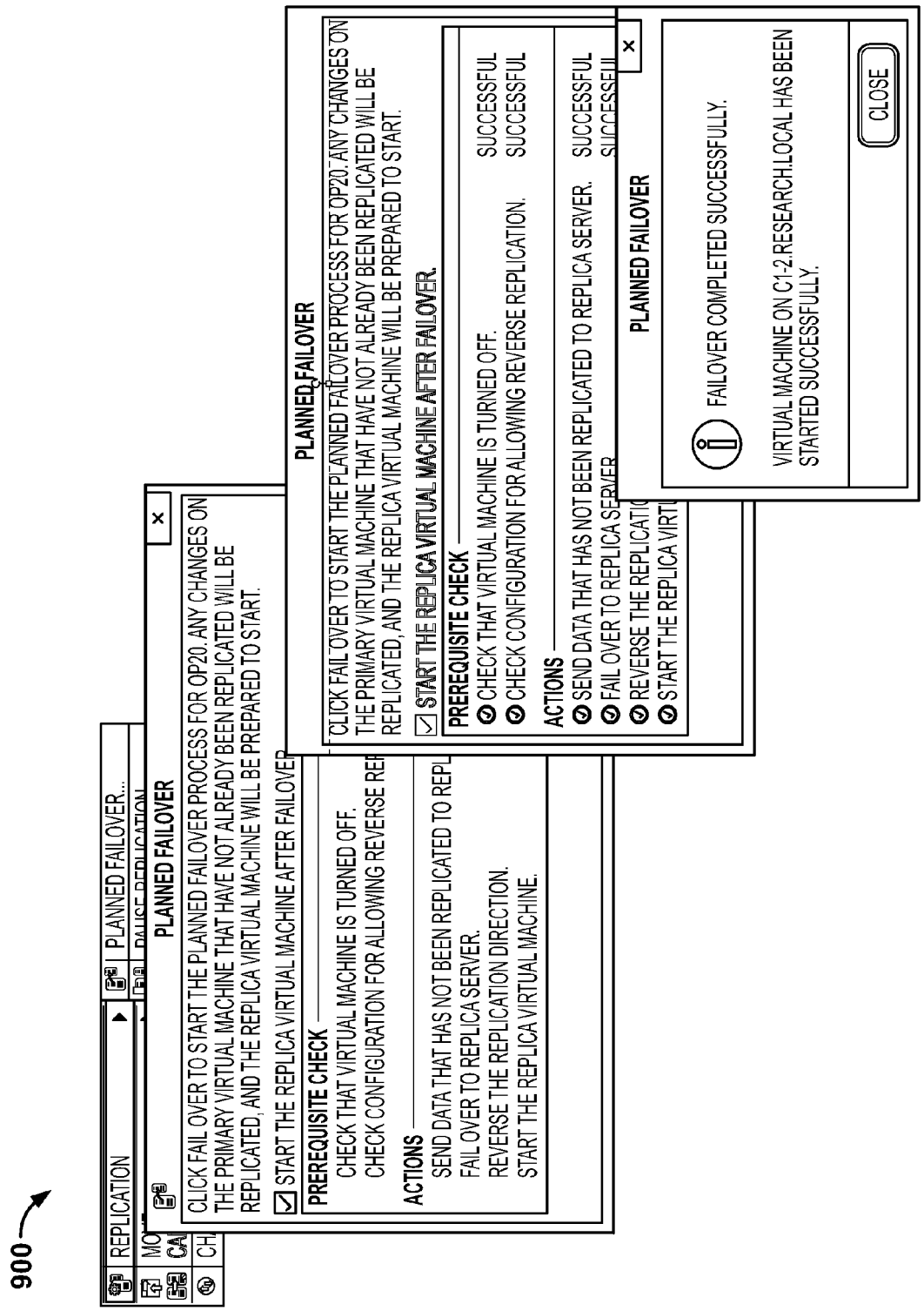
Figure 10:
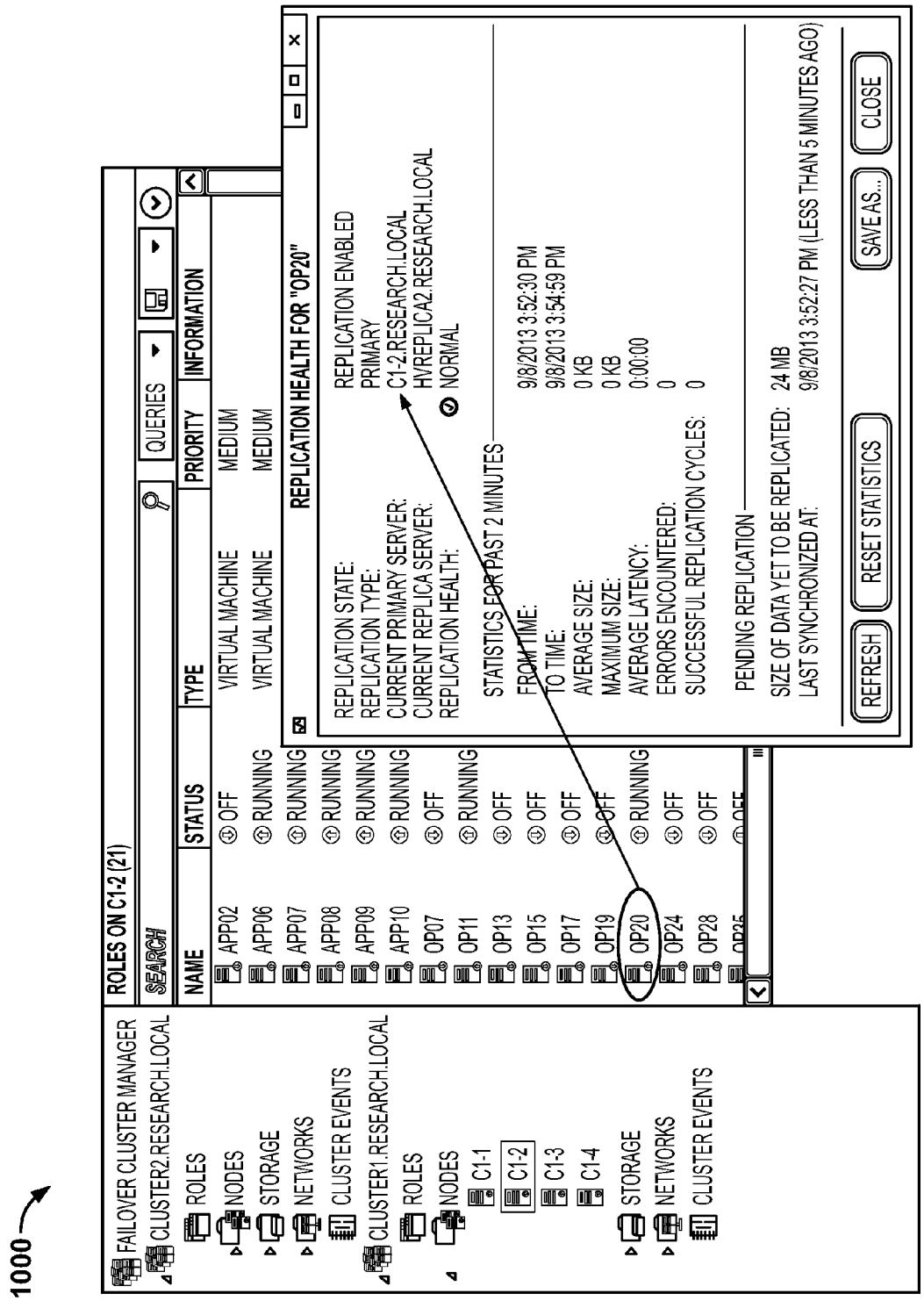
Figure 11:
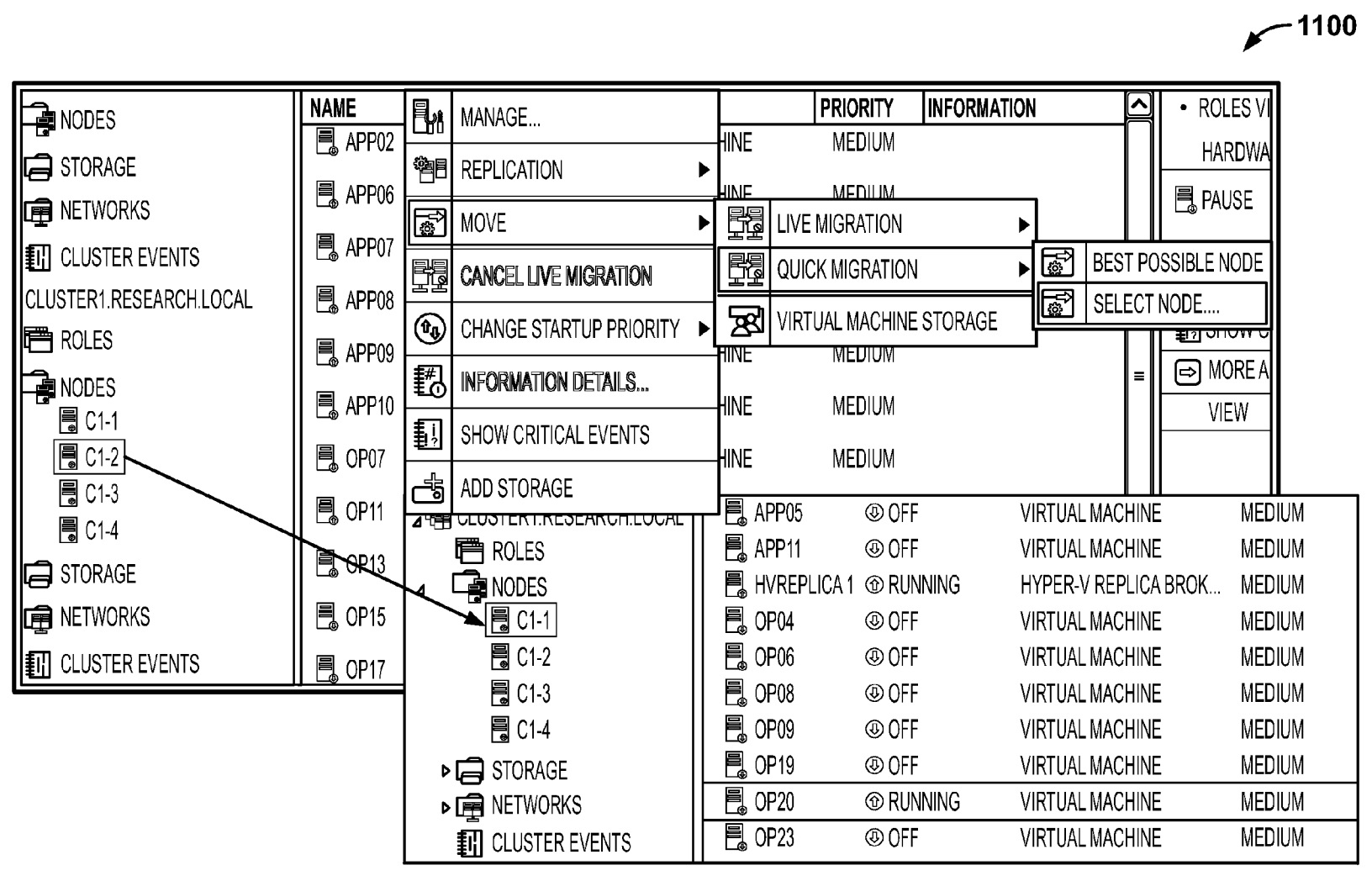

FIGS. 8-11 depict example user interfaces 800, 900, 1000, 1100 that can be used to the implement examples disclosed herein. In some examples, the user interfaces 800, 900, 1000, 1100 can be used to implement the process control system 300 of FIG. 3 when an operation (e.g., OP20) and/or the virtual machine 318 moves from the first cluster 302 to the second cluster 304 due to a failure. FIG. 9 shows the user interface 900 indicting that a failure of the OP20 and/or the virtual machine 318 has occurred. FIG. 10 shows the user interface 1000 indicating that the OP20 and/or the virtual machine 318 is running on the second cluster 304. FIG. 11 shows the migration of the virtual machine 318 from the second cluster 304 back to the first cluster 302 after the first cluster 302 has been repaired.

Figure 12:
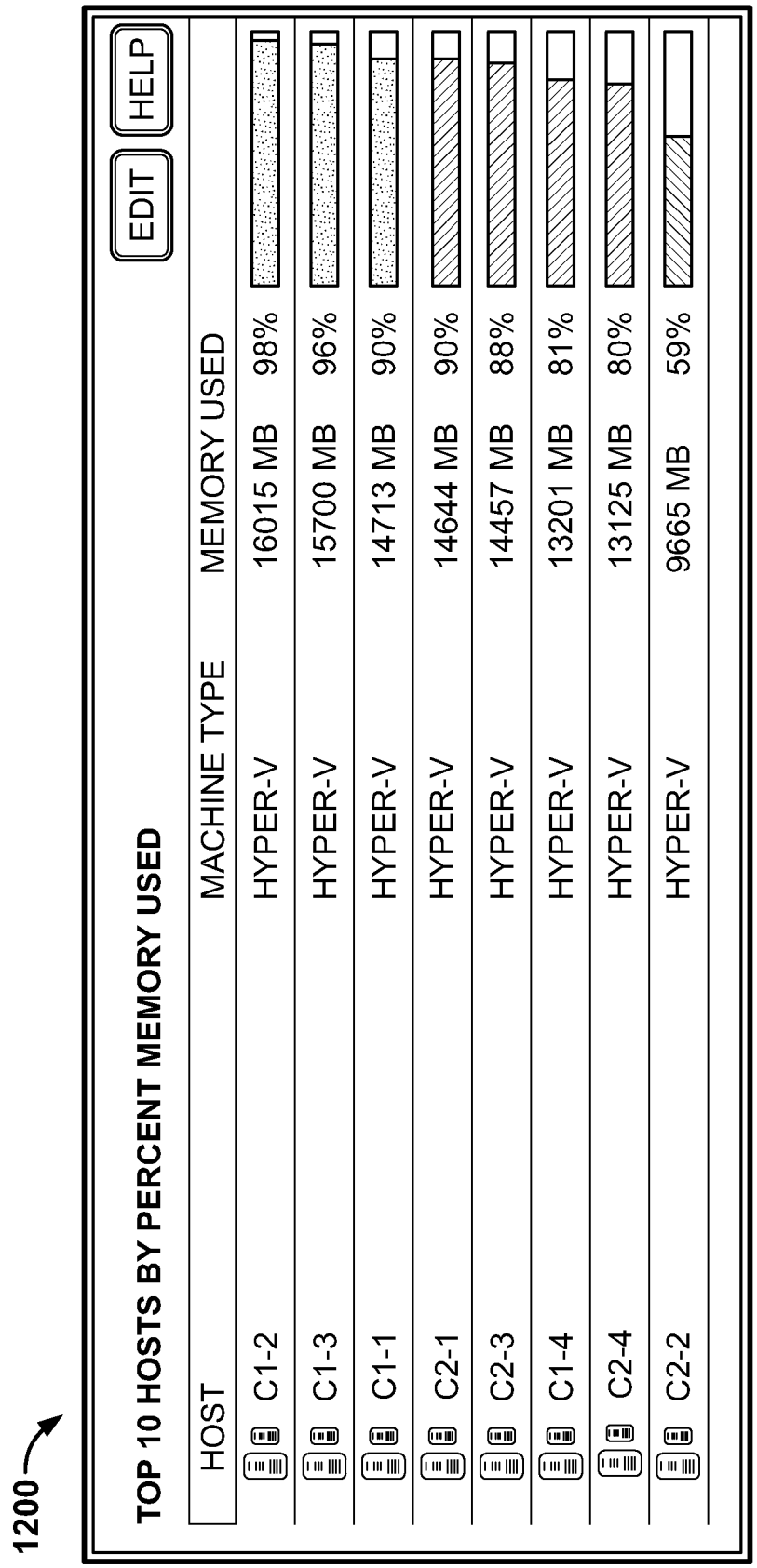
FIG. 12 depicts an example user interface showing performance testing and/or diagnostics of the example control systems disclosed herein.

FIG. 12 depicts an example user interface 1200 showing performance testing and/or diagnostics of the example control systems disclosed herein. In some examples, the example process control systems include 2 clusters running 64 virtual machines, 1 PROPlus, 13 application stations, 50 operation stations and/or 4 hosts per cluster. In some examples, the metrics performed and/or obtained include and/or are associated with system configuration, operator runtime, historical collection and/or replication. In some examples, the diagnostics performed and/or obtained include and/or are associated with Windows and/or SolarWinds.

Figure 13:
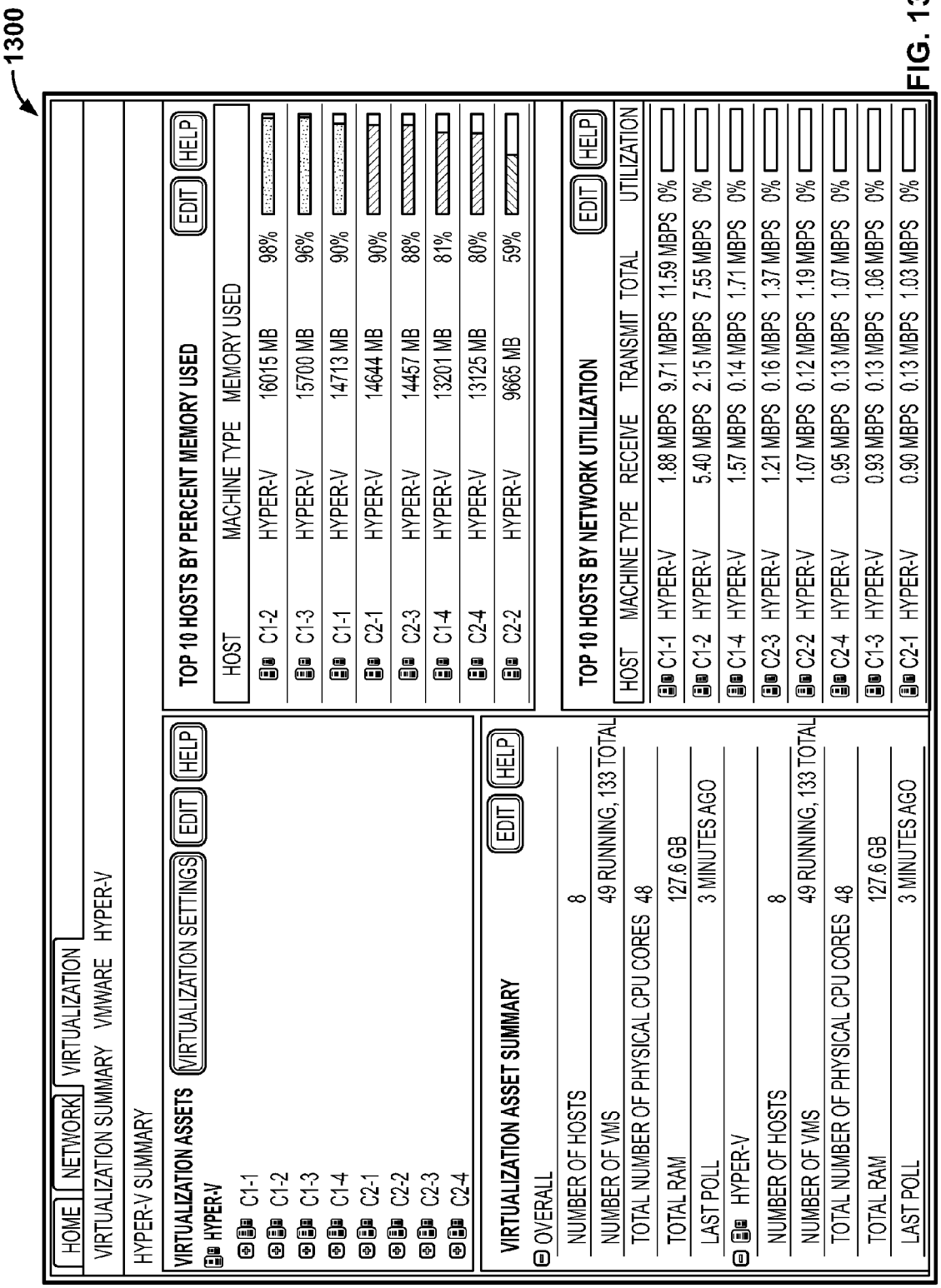
FIG. 13 depicts an example user interface showing diagnostic results of the example control systems disclosed herein.

FIG. 13 depicts an example user interface 1300 showing diagnostic results of the example control system disclosed herein. The user interface 1300 shows a Hyper-V summary illustrating the virtualization assets (e.g., C1-1; C1-2; etc.), the virtualization asset summary, the top 10 hosts by percent memory used and the top 10 host for network utilization.

Figure 14:
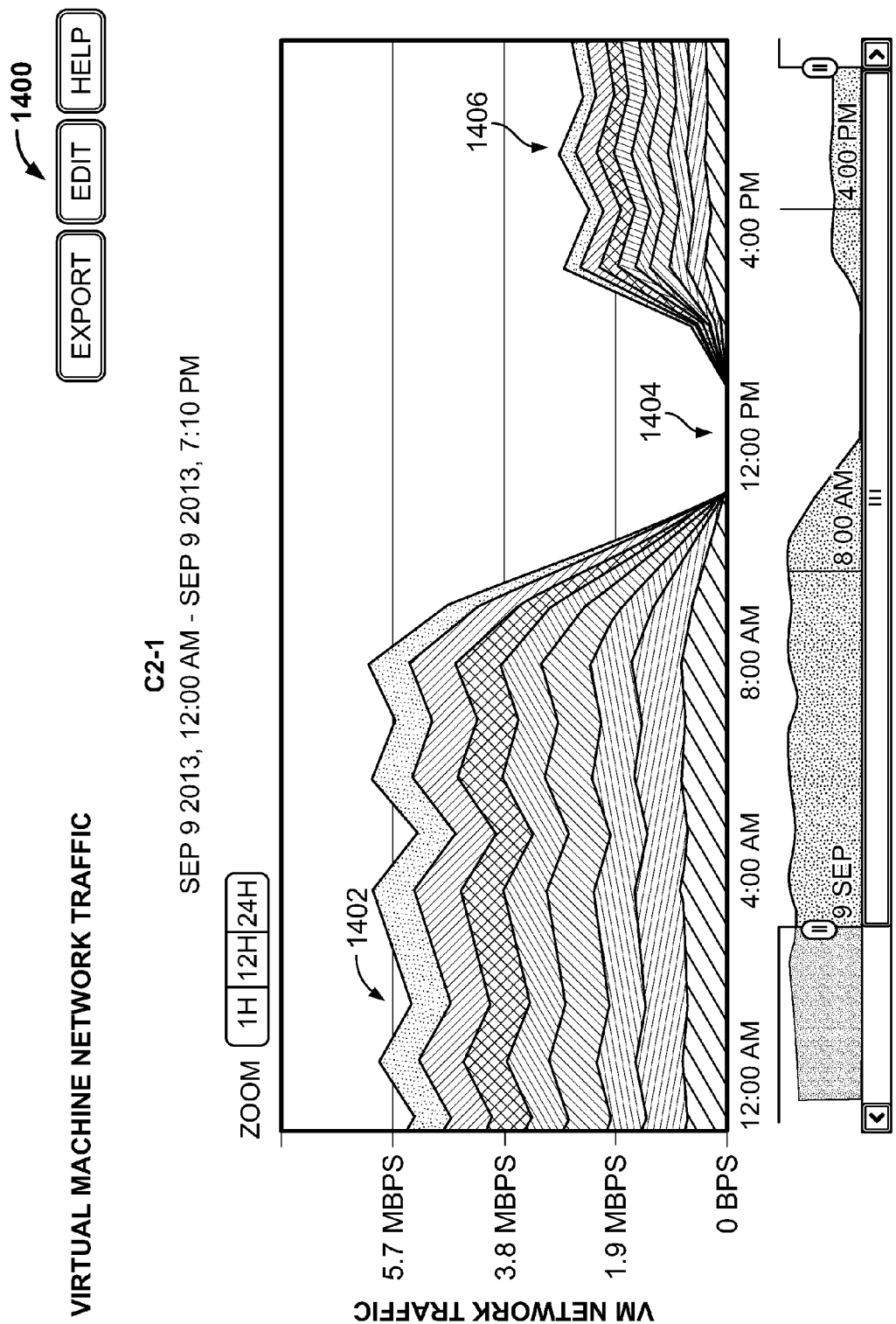
FIG. 14 depicts an example user interface showing virtual machine replication traffic in accordance with the teachings of this disclosure.

FIG. 14 depicts an example user interface 1400 showing virtual machine replication traffic where a first portion 1402 in time corresponds to when replication is disabled (e.g., while configuring), a second portion 1404 in time corresponds to when the system and/or a cluster (e.g., C2-1) is rebooted and a third portion 1406 in time corresponds to when the virtual machines are rebooted.

Figure 15:
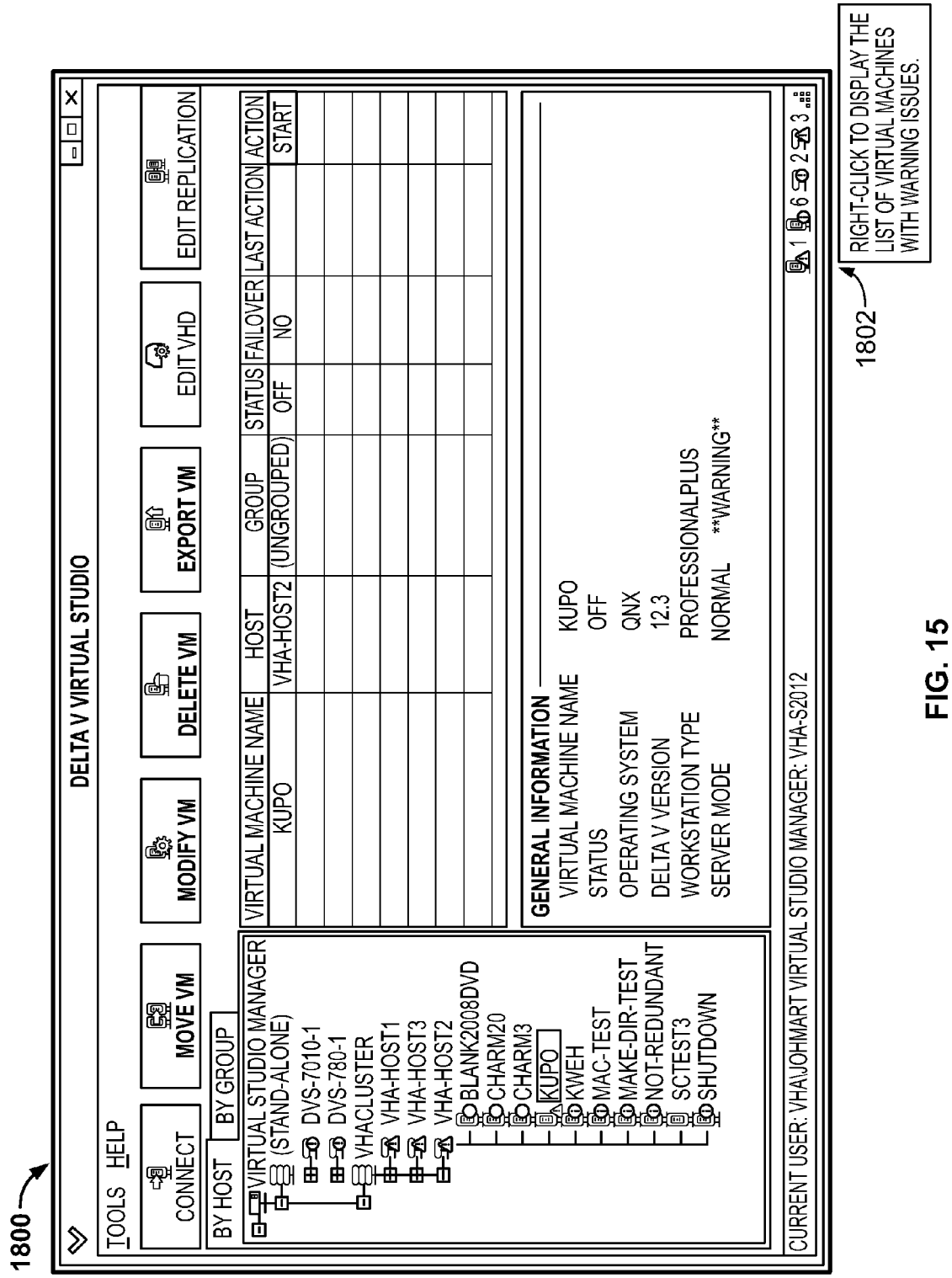
FIG. 15 depicts an example user interface that can be used to implement the examples disclosed herein.

FIG. 15 depicts an example user interface 1800 that can be used to implement the examples disclosed herein (e.g., automatically create, configure and manipulate pre-installed DeltaV virtual machines for process control). Specifically, the user interface 1800 illustrates diagnostic warnings associated with a virtual machine operating in a normal mode when the virtual machine should be operating in a resilient mode. Thus, the user interface 1800 describes the information being propagated up to the IT layer to enable correction of the operation mode to occur, if needed. In some examples, a tool tip 1802 is displayed when a user hovers (e.g., with a mouse arrow) over the diagnostic accrual numbers in the status bar of the application.

Figure 16:
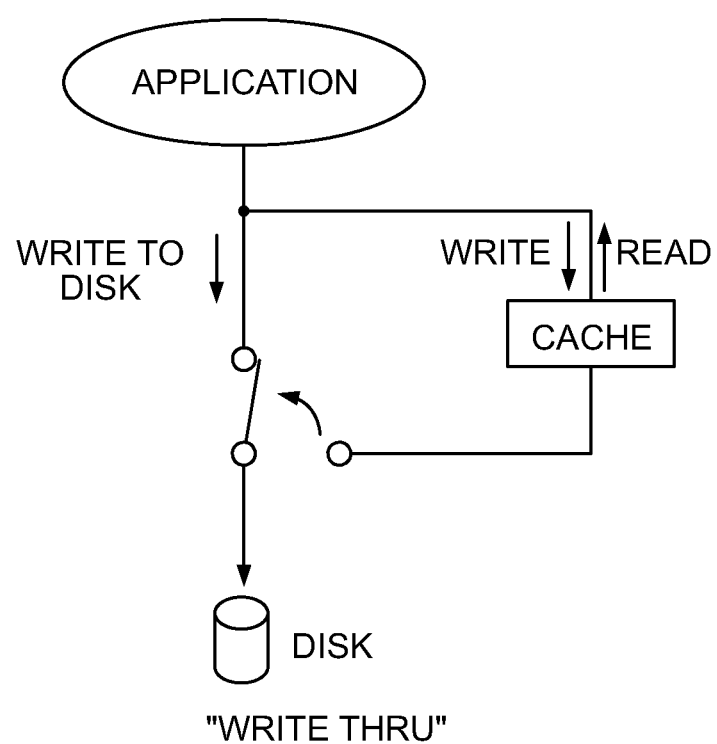
FIG. 16 illustrates writing through the cache and directly to a disk in accordance with the teachings of this disclosure.
Figure 17:
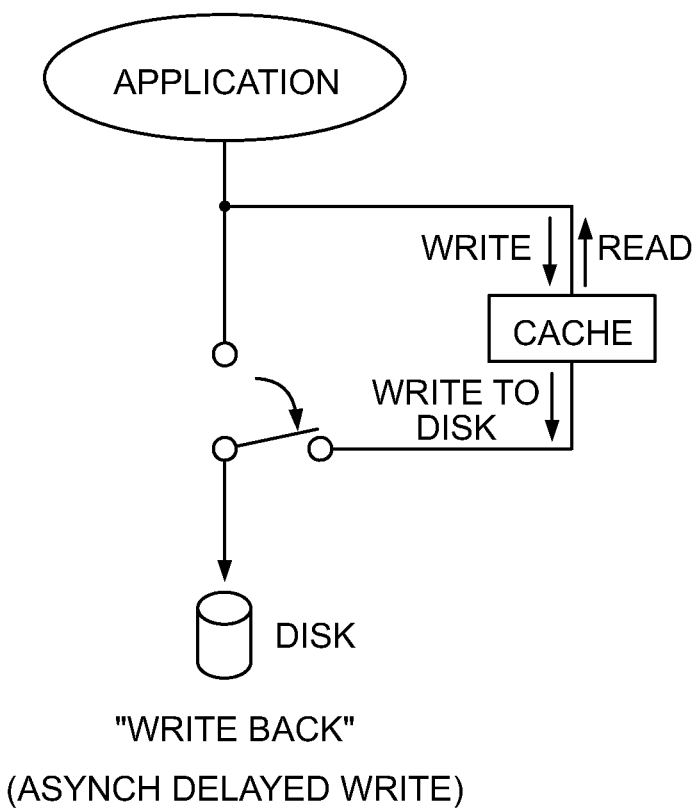
FIG. 17 illustrates writing to memory in accordance with the teachings of this disclosure.
Figure 18:
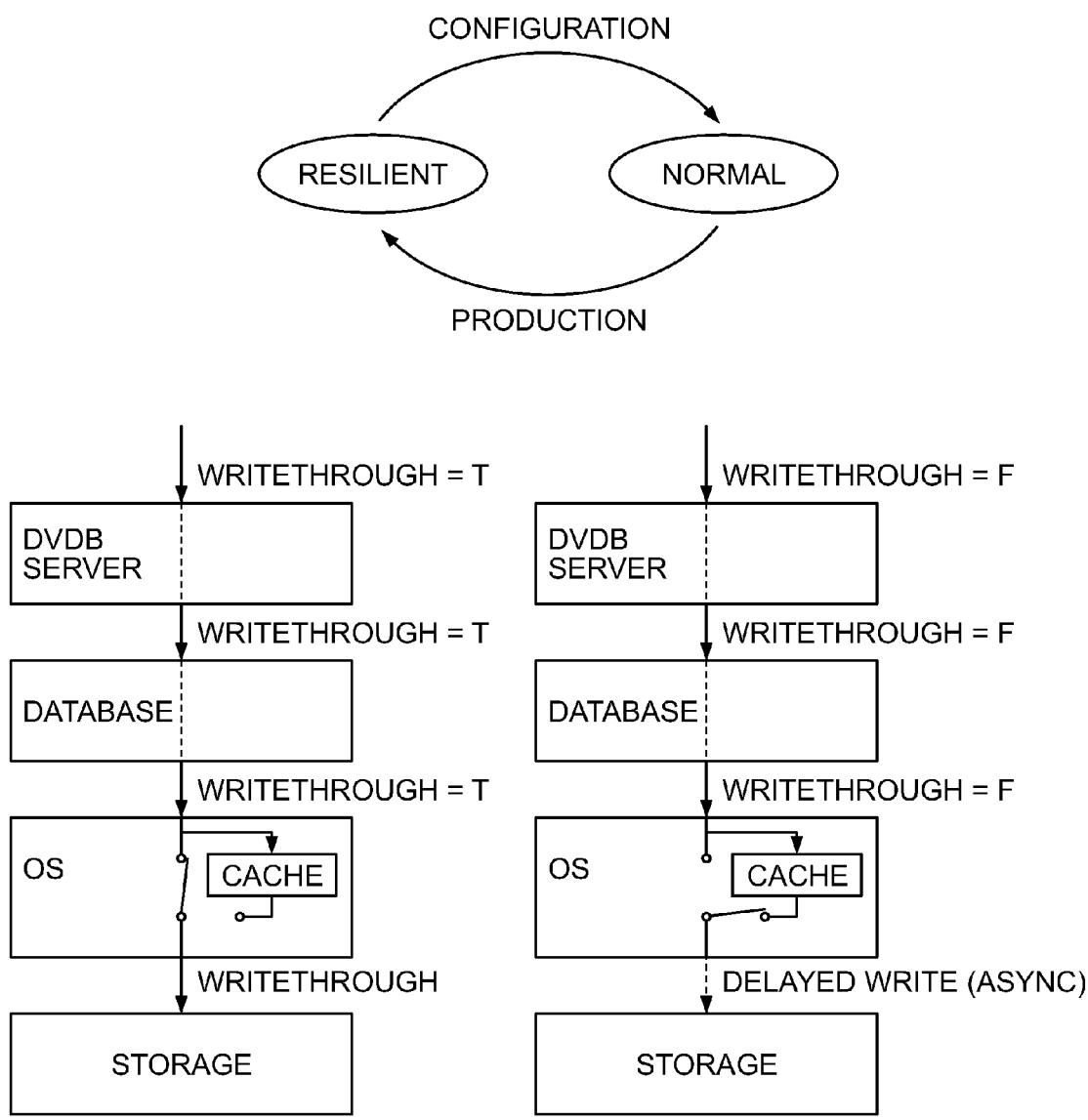
FIG. 18 illustrates process flows of operating in a normal mode and operating in a reliant mode.

FIG. 16 illustrates writing through the cache and directly to a disk (e.g., circumventing the cache; resilient mode) and FIG. 17 illustrates writing to memory (e.g., normal mode). FIG. 18 illustrates process flows of operating in a normal mode and operating in a reliant mode. In some examples, changing the cache enables the process control system to withstand a hardware failure without corrupting the configuration data used to control.

Figure 19:
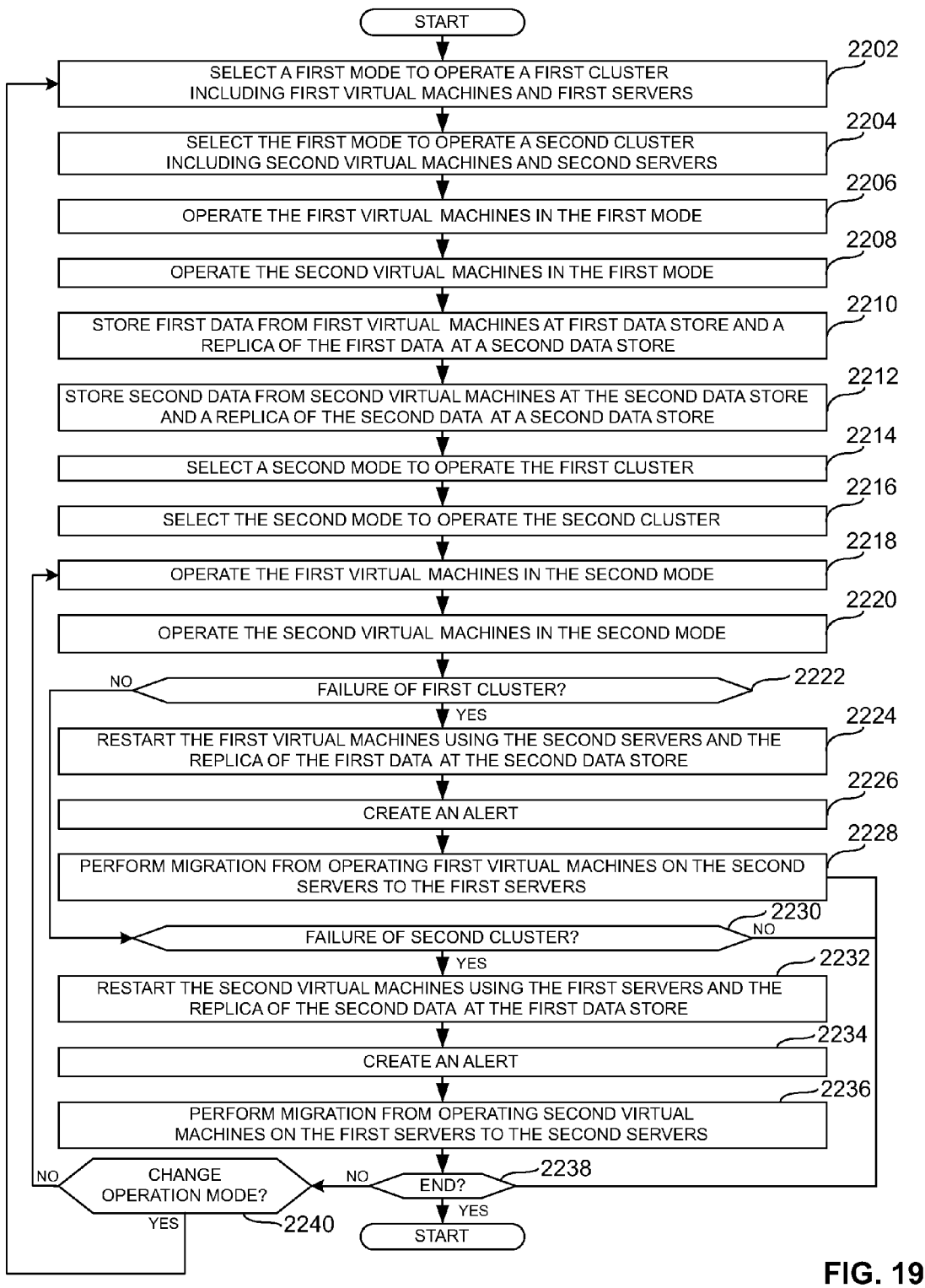
FIG. 19 is a flowchart representative of a method that may be executed to implement the process control systems of FIGS. 1-3.

A flowchart representative of an example method for implementing the process control systems of FIGS. 1-3 is shown in FIG. 19. In this example, the method may be implemented using machine readable instructions that comprise a program for execution by a processor such as the processor 2312 shown in the example processor platform 2300 discussed below in connection with FIG. 20. The program may be embodied in software stored on a tangible computer readable storage medium such as a CD-ROM, a floppy disk, a hard drive, a digital versatile disk (DVD), a Blu-ray disk, or a memory associated with the processor 2312, but the entire program and/or parts thereof could alternatively be executed by a device other than the processor 2312 and/or embodied in firmware or dedicated hardware. Further, although the example program is described with reference to the flowchart illustrated in FIG. 19, many other methods of implementing the example process control systems of FIGS. 1-3 may alternatively be used. For example, the order of execution of the blocks may be changed, and/or some of the blocks described may be changed, eliminated, or combined.

As mentioned above, the example method of FIG. 19 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 1-3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The example method of FIG. 19 begins with a first mode being selected to operate the first cluster 302 (block 2202). The first cluster 302 includes the virtual machines 318, 320, 322, 324 and the servers 306, 308, 310. The first mode is selected to operate the second cluster 304 (block 2204). The second cluster 304 includes the second virtual machines 326, 328, 330, 332 and the servers 312, 314, 316. In some examples, the first mode includes writing to a cache of the data stores 334, 336, 338 and/or 340 and may be associated with a configuration operation mode. The first virtual machines 318, 320, 322, 324 are operated in the first mode (block 2206). The second virtual machines 326, 328, 330, 332 are also operated in the first mode (block 2208).

First data from the first virtual machines 318, 320, 322, 324 is stored at the data stores 334 and/or 336 of the first cluster 302 and a replica of the first data from the first virtual machines 318, 320, 322, 324 is stored at the data stores 338 and/or 340 of the second cluster 304 (block 2210). In some examples, the first data and the replica of the first data is stored in parallel and/or in a consistent manner using file-level consistency. Second data from the second virtual machines 326, 328, 330, 332 is stored at the data stores 338 and/or 340 of the second cluster 304 and a replica of the second data from the second virtual machines 326, 328, 330, 332 is stored at the data stores 334 and/or 336 of the first cluster 302 (block 2212). In some examples, the second data and the replica of the second data is stored in parallel and/or in a consistent manner using file-level consistency.

After, for example, the process control system 300 has been configured, a second mode may be selected to operate the first cluster 302 (block 2214). The second mode is selected to operate the second cluster 304 (block 2216). In some examples, the second mode includes circumventing the cache of the data stores 334, 336, 338 and/or 340 and writing directly to a disk(s) of the data stores 334, 336, 338 and/or 340 to reduce an amount of time data is kept in volatile memory. The first virtual machines 318, 320, 322, 324 are operated in the second mode (block 2218). The second virtual machines 326, 328, 330, 332 are operated in the second mode (block 2220).

At block 2222, a processor determines if a failure of the first cluster 302 has occurred. If the first cluster 302 has failed, the first virtual machines 318, 320, 322, 324 are restarted using the servers 312, 314 and/or 316 of the second cluster 304 and the replica of the first data from the data stores 338 and/or 340 (block 2224). In some examples, an alert may be created and/or conveyed if the first virtual machines 318, 320, 322, 324 are restarted using the servers 312, 314 and/or 316 and/or if the first cluster 302 has failed (block 2226). In some examples, the alert indicates that both the first and second virtual machines 318, 320, 322, 324, 326, 328, 330, 332 are being run using the servers 312, 314 and/or 316 of the second cluster 304. Once the failure of the first cluster 302 has been resolved, a live migration may be performed from operating the first virtual machines 318, 320, 322, 324 using the servers 338, 340 of the second cluster 304 to operating the first virtual machines 318, 320, 322, 324 using the servers 334, 336 of the first cluster 302 (block 2228).

At block 2230, a processor determines if a failure of the second cluster 304 has occurred. If the second cluster 304 has failed, the second virtual machines 326, 328, 330, 332 are restarted using the servers 306, 308 and/or 310 of the first cluster 302 and the replica of the first data from the data stores 334 and/or 336 (block 2232). In some examples, an alert may be created and/or conveyed if the second virtual machines 326, 328, 330, 332 are restarted using the servers 306, 308 and/or 310 and/or if the second cluster 304 has failed (block 2234). In some examples, the alert indicates that both the first and second virtual machines 318, 320, 322, 324, 326, 328, 330, 332 are being run using the servers 306, 308, 310 of the first cluster 302. Once the failure of the second cluster 304 has been resolved, a live migration may be performed from operating the second virtual machines 326, 328, 330, 332 using the servers 334, 336 of the first cluster 302 to operating the second virtual machines 326, 328, 330, 332 using the servers 338, 340 of the second cluster 304 (block 2236). At block 2238, the process determines whether or not to end. If the process is to continue, at block 2240, a determination is made whether to change the operation mode between the second operation mode and the first operation mode, for example.

Figure 20:
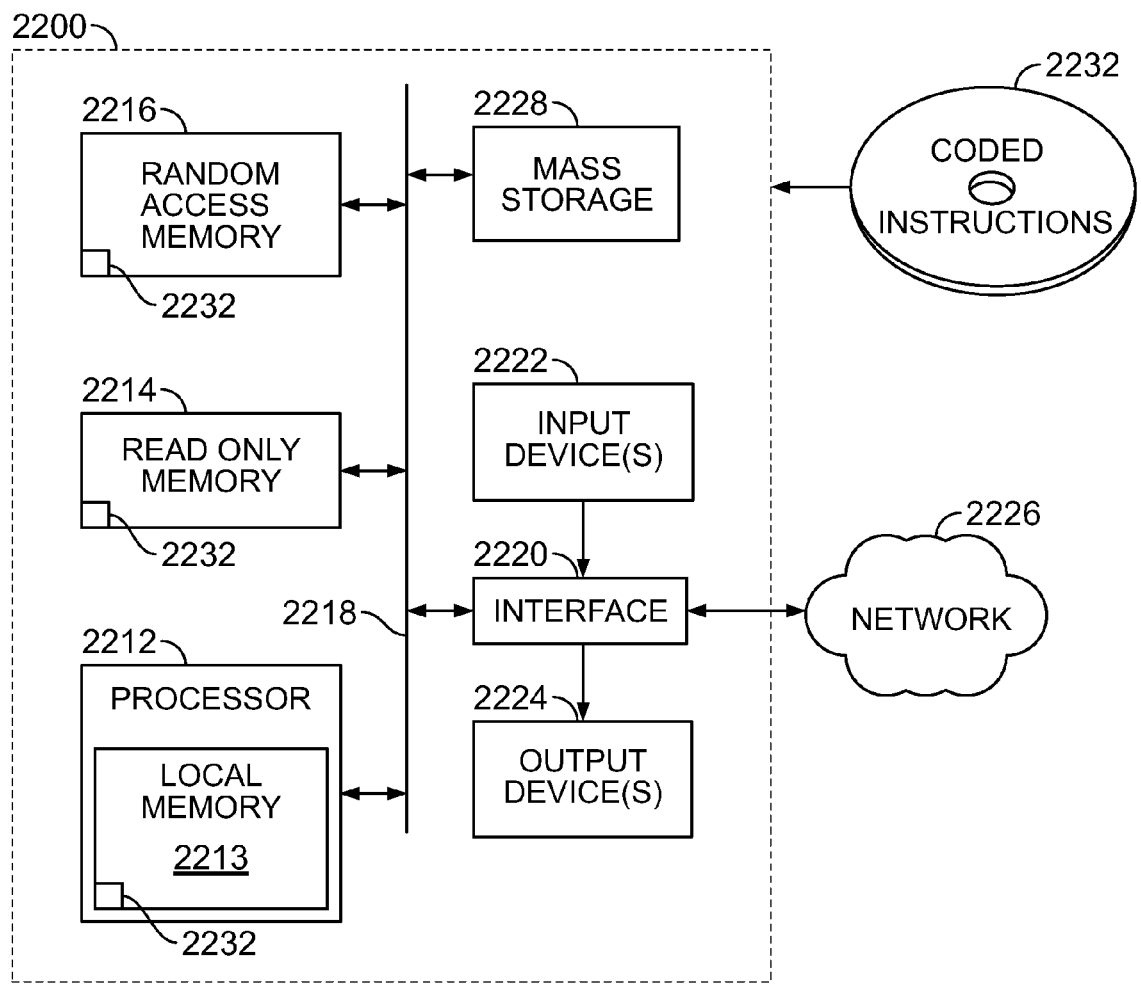
FIG. 20 shows a processor platform that may be used to implement the process control systems of FIGS. 1-3.

The processor platform 2300 of the illustrated example of FIG. 20 includes a processor 2312. The processor 2312 of the illustrated example is hardware. For example, the processor 2312 can be implemented by one or more integrated circuits, logic circuits, microprocessors or controllers from any desired family or manufacturer.

The processor 2312 of the illustrated example includes a local memory 2313 (e.g., a cache). The processor 2312 of the illustrated example is in communication with a main memory including a volatile memory 2314 and a non-volatile memory 2316 via a bus 2318. The volatile memory 2314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2316 may be implemented by flash memory and/or any other desired type of memory device. Access to the main memory 2314, 2316 is controlled by a memory controller.

The processor platform 2300 of the illustrated example also includes an interface circuit 2320. The interface circuit 2320 may be implemented by any type of interface standard, such as an Ethernet interface, a universal serial bus (USB), and/or a PCI express interface.

In the illustrated example, one or more input devices 2322 are connected to the interface circuit 2320. The input device(s) 2322 permit(s) a user to enter data and commands into the processor 2312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2324 are also connected to the interface circuit 2120 of the illustrated example. The output devices 23124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2320 of the illustrated example, thus, typically includes a graphics driver card, a graphics driver chip or a graphics driver processor.

The interface circuit 2320 of the illustrated example also includes a communication device such as a transmitter, a receiver, a transceiver, a modem and/or network interface card to facilitate exchange of data with external machines (e.g., computing devices of any kind) via a network 2326 (e.g., an Ethernet connection, a digital subscriber line (DSL), a telephone line, coaxial cable, a cellular telephone system, etc.).

The processor platform 2300 of the illustrated example also includes one or more mass storage devices 2328 for storing software and/or data. Examples of such mass storage devices 2328 include floppy disk drives, hard drive disks, compact disk drives, Blu-ray disk drives, RAID systems, and digital versatile disk (DVD) drives.

From the foregoing, it will be appreciated that the examples disclosed herein relate to computer architecture(s), networking and/or virtualization that enable the development of effective, easy to manage, virtualized computing environments that reduce costs and improves system up-time and/or start up time.

In some process control systems, at least some critical hardware components (e.g., controllers) are designed for redundancy but other components (e.g., VMs, servers, etc.) are not redundant or otherwise capable of dealing with and/or quickly recovering from disruptive events such as power outages, computer hardware failures, etc. If failures occur in such systems, the redundant critical components (e.g., the controls) may enable the plant to continue to operate. However, restoring the non-redundant components (e.g., VMs, servers, etc.) and/or the plant to its normal operating system may take a significant amount of time during which plant data (e.g., important plant data) may be invisible, not viewable and/or lost.

In contrast to some known systems, the examples process control systems disclosed herein provide and/or enable high availability and/or replication that enable reduction in down-time in virtual environments if a failure occurs. Further, the disclosed examples substantially prevent data loss and/or data corruption by enabling the process control system to have written and/or available log files associated with all components of the systems and/or by enabling the system to be aware of the highly available virtualization architecture of the overall system. Put simply, the examples disclosed herein provide an out-of-the-box high availability control system.

To enable the log files of the components to be accessible, redundant hard drive storage (e.g., redundant array of independent disks (RAID) array) are accessed by and/or written by multiple host computers at the same time in parallel. Thus, using the disclosed examples, virtual hard drives of virtual machines are viewable and/or can be seen by more than one host computer. In such examples, if a failure occurs (e.g., a hardware failure, a software failure) in one of the host computers, another host computer can take over and/or run the virtual hard drive and restart an associated virtual machine based on the last saved information of the hard drive storage.

In some example process control systems disclosed herein, to substantially protect against data corruption, data is written in a consistent manner using file-level consistency using, for example, an NTFS file system, an NTFS Log (journal), a Volume Shadow Copy (VSS) and/or Transactional NTFS. Additionally and/or alternatively, the example process control systems disclosed herein enable the system to be instructed to write through cache and save directly to disk, a hard drive and/or a virtual hard drive. In such examples, to enable logical file consistency in an object oriented database, the example process control system and/or a component thereof is run in a resilient mode, which enables direct write through cache and substantially minimizes an amount of time volatile data is kept in memory, for example. In some examples, writing through the cache causes decreased performance because disk writes are slower than memory writes. For example, if the cache is used, the application and/or the user will commit data to cache and the system will write the data through later. However, because a majority of the configuration work occurs before the system goes on-line to run a plant and/or process control system, the resilient mode may be turned off during the initial engineering and/or configuration as data loss and/or corruption has no negative implications on running the plant at this time (e.g., no process is being controlled).

In some examples, to enable the entire and/or substantially the entire system to be consistent, the control system functions and the virtualization functions are integrated. For example, to enable such integration, the resilient and/or normal operating mode settings are propagated up the virtualization management software to enable visibility at the same level as the virtualization and high availability settings.

In other examples, control system functions and virtualization functions are integrated using a process control system (e.g., DVS) that manages VM node redundancy and high availability in unison. In some such examples, an alarm (e.g., DVS alarm) occurs if a redundant pair of application stations (e.g., DeltaV application stations) is assigned to the same host computer because having application stations assigned to the same host may cause and/or create a longer than usual disruption if the host fails. In some examples, redundancies and standbys are distributed across multiple hosts to enable a node switchover to occur if a failure occurs in one of the hosts.

Virtualized computing platforms as disclosed herein that enable non-traditional measurements to be integrated using wireless infrastructure, for advanced analytics to combine predictive algorithms and automation to provide on-line predictive capabilities and/or for new designs and/or platforms to be used to connect people on the move and in the control room. Such examples may be advantageously used for virtualization and big data in process control.

Some disclosed examples enable high availability, failover cluster management, virtual machine replication, disaster recovery, performance data and/or platform configurations. Some disclosed examples enable virtualization scale-up, live migration (e.g., faster, unrestricted, simultaneous virtual machine live migrations and/or storage migrations), shared nothing migrations, high availability failover clustering (e.g., iSCSI, fiber channel, SMB), failover prioritization, NIC teaming and/or management and/or replication support.

Some disclosed examples enable a host to include up to approximately 160 logical processors, up to approximately 2 terabytes (TB) of memory and/or up to approximately up to 1024 virtual central processing units (CPUs) per host. Some disclosed examples enable a virtual machine to include and/or be associated with up to approximately 32 virtual CPUs per host, up to approximately 1 TM of memory per VM and/or up to approximately 1024 active VMs per host. Some disclosed examples enable a cluster to include and/or be associated with approximately 64 nodes and/or approximately 4000 VMs.

The examples disclosed herein can be used to obtain and/or analyze streams of data (e.g., big data) to provide new insights, better decisions and/or provide an improved system experience. In some examples, the examples disclosed herein can support receipt of periodic uncompressed data collected on all process measurements and/or outputs to enable different types of data to be analyzed, one received. Some examples disclosed herein can support information sources such as traditional types of alarms, batches and/or continuous new sources such an on-stream analyzers. Some examples disclosed herein can support cross plant boundaries (e.g., entire oil fields), data agility and/or provide actionable information to users through browsers and/or mobile devices. For example, data exploration may indicate and/or identify that information that was previously not being recorded should now be recorded using, for example, wireless sensors (e.g., vibration sensors).

The example process control systems enable all or substantially all data to be with high resolution to enable analysis thereon. The obtained data may be cleaned and/or filtered and/or explored using, for example, high frequency real time data, which provides and/or enables increased insight. The example process control systems enable and/or join analytics obtained across systems, platforms and/or plants. The example process control systems enable and/or support additional measurements being obtained via wireless and/or external measurements via, for example, REST API, that can be called from any language. The process control systems provide actionable results for humans and/or closed loop control.

In some examples, templates are designed for high availability and replication to enable users to enable these features as part of the template and then make use of the capabilities as we create instances from the template. In some examples, networking infrastructure used in virtualized environments are predefined to easily distinguish a control network (e.g., a primary control network, a secondary control network), the host/management network and/or other networks (e.g., the plant network). In some examples, a domain controller is integrated into the infrastructure so enable users to not have to setup and manage their computing resources. In some examples, diagnostics are integrated into the control system to enable the user to not have to use tools (e.g., SolarWinds) to collect information associated with their networks, disk subsystem, CPU resources, memory resources, IO throughput, IO delays, clusters and/or replication system. In some examples, the diagnostics are reported in-context of the control system as opposed to be being more abstract IT items. In some examples, an example management center is integrated with DeltaV configuration and diagnostics. In some examples, diagnostics can be run on control system traffic and/or usage (e.g., provide an alert if usage patterns change, etc.). In some examples, the system is secured and/or managed by segmenting network traffic and securing infrastructure traffic. In some examples, a hardware platform under virtualization may be used to implement the disclosed examples. In some examples, Virtual Studio, DeltaV infrastructure, hardware (e.g., VRTX platform from Dell), enables a virtual appliance for process control. In some examples, the example process control systems and integrated and/or may include and/or use templates, diagnostics and/or configuration tools and/or aspects.

As set forth herein, an example method includes operating a first cluster including first virtual machines and first servers and operating a second cluster including second virtual machines and second servers. The example method includes storing first data from the first virtual machines at a first data store of the first cluster and storing a replica of the first data at a second data store of the second cluster and storing second data from the second virtual machines at the second data store and storing a replica of the second data at the first data store. The method also includes identifying a failure of the first cluster and, in response to the failure, restarting the first virtual machines using the second servers and the replica of the first data at the second data store.

In some examples, storing the first data includes circumventing a cache of the first data store and writing directly to a disk of the first data store during a normal operating mode to reduce an amount of time data is kept in volatile memory. In some examples, storing the first data comprises writing to a cache of the first data store during a configuration operating mode. In some examples, restarting the virtual machines using the second servers reduces downtime. In some examples, storing the first data from the first virtual machines at the first data store and storing the replica of the first data at the second data store comprises storing the first data at the first and second data stores in parallel. In some examples, storing the first data from the first virtual machines at the first data store and storing the replica of the first data at the second data store includes storing the first data at the first and second data stores in a consistent manner using file-level consistency. In some examples, the method includes creating an alert if the first virtual machines are restarted using the second servers.

In some examples, the method also includes performing a substantially live migration from operating the first virtual machines using the second servers to operating the first virtual machines using the first servers after the failure of the first cluster is resolved. In some examples, the method includes restarting the first virtual machines using the second servers and the replica of the first data at the second data store comprises automatically restarting the first virtual machines using the second servers and the replica of the first data at the second data store. In some examples, the first cluster is redundant of the second cluster. In some examples, the method includes automatically updating the second cluster.

Another example method includes selecting a first mode to operate a first cluster including first virtual machines and first servers and operating the first cluster in the first mode includes writing to a cache of a first data store to store the first data from the first virtual machines and selecting a second mode to operate the first cluster. The method also includes operating the first cluster in the second mode comprising circumventing the cache and writing directly to a disk of the first data store to store first data from the first virtual machines.

In some examples, the first mode includes a configuration mode and the second mode includes a resilient mode.

In some examples, the method also includes selecting a third mode to operate a second cluster including second virtual machines and second servers operating the second cluster in the third mode comprising writing to a cache of a second data store to store the second data from the second virtual machines. The method also includes selecting a fourth mode to operate the second cluster and operating the second cluster in the fourth mode comprising circumventing the cache and writing directly to a disk of the second data store to store second data from the second virtual machines.

In some examples, the first cluster in the second mode also includes storing a replica of the first data at the second data store of the second cluster and wherein operating the second cluster comprises storing a replica of the second data at the first data store. In some examples, the method also includes identifying a failure of the first cluster and restarting the first virtual machines using the second servers and the replica of the first data at the second data store. In some examples, the method includes creating an alert if the first virtual machines are restarted using the second servers. In some examples, the method also includes performing a substantially live migration from operating the first virtual machines using the second servers to operating the first virtual machines using the first servers after the failure of the first cluster is resolved.

In some examples, storing the first data from the first virtual machines at the first data store and storing the replica of the first data at the second data store includes storing the first data at the first and second data stores in parallel. In some examples, storing the first data from the first virtual machines at the first data store and storing the replica of the first data at the second data store includes storing the first data at the first and second data stores in a consistent manner using file-level consistency.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    operating a first cluster comprising first virtual machines and first servers;
    operating a second cluster comprising second virtual machines and second servers;
    storing first data from the first virtual machines at a first data store of the first cluster and storing a replica of the first data at a second data store of the second cluster;
    storing second data from the second virtual machines at the second data store and storing a replica of the second data at the first data store;
    identifying a failure of the first cluster; and
    in response to the failure, restarting the first virtual machines using the second servers and the replica of the first data at the second data store, wherein storing the first data comprises circumventing a cache of the first data store and writing directly to a disk of the first data store during a normal operating mode to reduce an amount of time data is kept in volatile memory.

2. The method of claim 1, wherein restarting the first virtual machines using the second servers reduces downtime.

3. The method of claim 1, wherein storing the first data from the first virtual machines at the first data store and storing the replica of the first data at the second data store comprises storing the first data at the first and second data stores in parallel.

4. The method of claim 1, wherein storing the first data from the first virtual machines at the first data store and storing the replica of the first data at the second data store comprises storing the first data at the first and second data stores in a consistent manner using file-level consistency.

5. The method of claim 1, further comprising creating an alert if the first virtual machines are restarted using the second servers.

6. The method of claim 1, further comprising performing a substantially live migration from operating the first virtual machines using the second servers to operating the first virtual machines using the first servers after the failure of the first cluster is resolved.

7. The method of claim 1, wherein restarting the first virtual machines using the second servers and the replica of the first data at the second data store comprises automatically restarting the first virtual machines using the second servers and the replica of the first data at the second data store.

8. The method of claim 1, wherein the first cluster is redundant of the second cluster.

9. The method of claim 1, further comprising automatically updating the second cluster.

10. A method, comprising:
    operating a first cluster comprising first virtual machines and first servers;
    operating a second cluster comprising second virtual machines and second servers;
    storing first data from the first virtual machines at a first data store of the first cluster and storing a replica of the first data at a second data store of the second cluster;
    storing second data from the second virtual machines at the second data store and storing a replica of the second data at the first data store;
    identifying a failure of the first cluster; and
    in response to the failure, restarting the first virtual machines using the second servers and the replica of the first data at the second data store, wherein storing the first data comprises writing to a cache of the first data store during a configuration operating mode.

11. The method of claim 10, wherein restarting the first virtual machines using the second servers reduces downtime.

12. The method of claim 10, wherein storing the first data from the first virtual machines at the first data store and storing the replica of the first data at the second data store comprises storing the first data at the first and second data stores in parallel.

13. The method of claim 10, wherein storing the first data from the first virtual machines at the first data store and storing the replica of the first data at the second data store comprises storing the first data at the first and second data stores in a consistent manner using file-level consistency.

14. The method of claim 10, further comprising creating an alert if the first virtual machines are restarted using the second servers.

15. The method of claim 10, further comprising performing a substantially live migration from operating the first virtual machines using the second servers to operating the first virtual machines using the first servers after the failure of the first cluster is resolved.

16. The method of claim 10, wherein restarting the first virtual machines using the second servers and the replica of the first data at the second data store comprises automatically restarting the first virtual machines using the second servers and the replica of the first data at the second data store.

17. The method of claim 10, wherein the first cluster is redundant of the second cluster.

18. The method of claim 10, further comprising automatically updating the second cluster.

19. A method, comprising:
selecting a first mode to operate a first cluster comprising first virtual machines and first servers;
operating the first cluster in the first mode comprising writing to a cache of a first data store to store the first data from the first virtual machines;
selecting a second mode to operate the first cluster; and
operating the first cluster in the second mode comprising circumventing the cache and writing directly to a disk of the first data store to store first data from the first virtual machines.

20. The method of claim 19, wherein the first mode comprises a configuration mode and the second mode comprises a resilient mode.

21. The method of claim 19, further comprising:
selecting a third mode to operate a second cluster comprising second virtual machines and second servers;
operating the second cluster in the third mode comprising writing to a cache of a second data store to store the second data from the second virtual machines;
selecting a fourth mode to operate the second cluster; and
operating the second cluster in the fourth mode comprising circumventing the cache and writing directly to a disk of the second data store to store second data from the second virtual machines.

22. The method of claim 21, wherein operating the first cluster in the second mode further comprises storing a replica of the first data at the second data store of the second cluster and wherein operating the second cluster comprises storing a replica of the second data at the first data store.

23. The method of claim 22, further comprising identifying a failure of the first cluster and restarting the first virtual machines using the second servers and the replica of the first data at the second data store.

24. The method of claim 23, further comprising creating an alert if the first virtual machines are restarted using the second servers.

25. The method of claim 23, further comprising performing a substantially live migration from operating the first virtual machines using the second servers to operating the first virtual machines using the first servers after the failure of the first cluster is resolved.

26. The method of claim 22, wherein storing the first data from the first virtual machines at the first data store and storing the replica of the first data at the second data store comprises storing the first data at the first and second data stores in parallel.

27. The method of claim 22, wherein storing the first data from the first virtual machines at the first data store and storing the replica of the first data at the second data store comprises storing the first data at the first and second data stores in a consistent manner using file-level consistency.

* * * * *